United States Patent
Pierce et al.

(10) Patent No.: US 12,393,931 B2
(45) Date of Patent: Aug. 19, 2025

(54) BLOCKCHAIN INCLUDING LINKED DIGITAL ASSETS

(71) Applicant: Chicago Mercantile Exchange Inc., Chicago, IL (US)

(72) Inventors: Ryan David Pierce, Chicago, IL (US); Ajay Sunderajan Madhavan, Aurora, IL (US); Stanislav Liberman, Highland Park, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 332 days.

(21) Appl. No.: 17/064,762

(22) Filed: Oct. 7, 2020

(65) Prior Publication Data
US 2021/0035092 A1 Feb. 4, 2021

Related U.S. Application Data

(63) Continuation of application No. 15/655,227, filed on Jul. 20, 2017, now Pat. No. 10,839,379.

(51) Int. Cl.
*G06Q 20/38* (2012.01)
*G06Q 20/02* (2012.01)
(Continued)

(52) U.S. Cl.
CPC .......... *G06Q 20/38* (2013.01); *G06Q 20/02* (2013.01); *G06Q 20/08* (2013.01); *G06Q 20/223* (2013.01); *G06Q 20/367* (2013.01); *G06Q 20/3825* (2013.01); *G06Q 20/389* (2013.01); *G06Q 20/401* (2013.01); *G06Q 20/06* (2013.01);
(Continued)

(58) Field of Classification Search
None
See application file for complete search history.

(56) References Cited

U.S. PATENT DOCUMENTS 9,608,829 B2  3/2017  Spanos et al.
9,747,586 B1  8/2017  Frolov
(Continued)

FOREIGN PATENT DOCUMENTS

WO  WO-0148633 A1 *  7/2001  ........... G06Q 20/367
WO  2017027648 A1  2/2017
(Continued)

OTHER PUBLICATIONS

Antonopoulos, "Mastering Bitcoin," O'Reilly Media, all pages. (Year: 2014).*
(Continued)

*Primary Examiner* — Eduardo Castilho
(74) *Attorney, Agent, or Firm* — Lempia Summerfield Katz LLC

(57) ABSTRACT

A blockchain includes different digital assets, including digital tradeable tokens and inventory tokens. The blockchain may implement a transaction type that includes both digital tradeable tokens and the inventory tokens. The digital tradeable tokens and inventory tokens may be associated with physical assets that can be uniquely identified and are intended to be fungible with each other. The validation rules of the blockchain may rely upon quantities of the digital tradeable token and inventory tokens satisfying a predetermined relationship.

25 Claims, 14 Drawing Sheets

(51) Int. Cl.

| | |
|---|---|
| *G06Q 20/06* | (2012.01) |
| *G06Q 20/08* | (2012.01) |
| *G06Q 20/22* | (2012.01) |
| *G06Q 20/36* | (2012.01) |
| *G06Q 20/40* | (2012.01) |
| *G06Q 40/04* | (2012.01) |
| *G06Q 40/06* | (2012.01) |
| *H04L 9/32* | (2006.01) |

(52) U.S. Cl.
CPC ....... *G06Q 20/065* (2013.01); *G06Q 20/3827* (2013.01); *G06Q 40/04* (2013.01); *G06Q 40/06* (2013.01); *G06Q 2220/00* (2013.01); *H04L 9/3234* (2013.01); *H04L 9/3247* (2013.01)

(56) References Cited

U.S. PATENT DOCUMENTS

| | | | | |
|---|---|---|---|---|
| 10,523,443 | B1* | 12/2019 | Kleinman | ............... H04L 9/30 |
| 10,657,595 | B2 | 5/2020 | De Jong | |
| 2015/0012446 | A1* | 1/2015 | Huang | ............... G06F 21/105 |
| | | | | 705/310 |
| 2015/0127507 | A1* | 5/2015 | Hall | ............... G06Q 30/0627 |
| | | | | 705/37 |
| 2016/0253677 | A1* | 9/2016 | Azmi | ............... G06Q 30/0278 |
| | | | | 705/37 |
| 2016/0292672 | A1* | 10/2016 | Fay | ............... G06Q 20/3829 |
| 2016/0328705 | A1* | 11/2016 | Sebag | ............... G06Q 20/381 |
| 2017/0005804 | A1 | 1/2017 | Zinder | |
| 2017/0024818 | A1* | 1/2017 | Wager | ............... G06Q 40/04 |
| 2017/0213210 | A1 | 7/2017 | Kravitz | |
| 2018/0068359 | A1 | 3/2018 | Preston | |
| 2018/0189528 | A1 | 7/2018 | Hanis | |
| 2018/0204190 | A1 | 7/2018 | Moy | |
| 2018/0240191 | A1 | 8/2018 | Aronson | |
| 2018/0241546 | A1* | 8/2018 | Leng | ............... G06Q 20/38215 |
| 2019/0130483 | A1 | 5/2019 | De Jong | |
| 2019/0130484 | A1* | 5/2019 | de Jong | ............... G06Q 20/401 |

FOREIGN PATENT DOCUMENTS

| | | | |
|---|---|---|---|
| WO | WO-2017194976 A1 * | 11/2017 | ........... G06Q 10/087 |
| WO | 2018002830 A1 | 1/2018 | |

OTHER PUBLICATIONS

Manly, Ronan, "The Keys to the Gold Vaults at the New York Fed—Part 1," www.bullionstar.com/blogs, all pages. (Year: 2015).*
"Categories of Gold Bars," www.goldbarsworldwide.com, all pages. (Year: 2011).*
"Developer Guide", Bitcoin, Apr. 28, 2017, 56 pages.
"Digital Assets on Public Blockchains", BitFury Group, White paper, Mar. 15, 2016, 37 pages.
"The Royal Mint and CME Group to Launch Royal Mint Gold", The Royal Mint, Nov. 29, 2016, 2 pages.
Addison Cameron-Huff, How Tokenization is Putting Real World Assets on Blockchains, Nov. 30, 2017, http://www.nasdaq.com.
Anonymous; "Tether: Fiat Currencies on the Bitcoin Blockchain", from https://tether.to/wp-content/uploaes/2016/06/tetherwhitepaper.pdf; Jun. 30, 2016.
Anonymous; Vaultoro.com. The Bitcoin Gold Exchange, from https://www.youtube.com, Sep. 27, 2018.
Anthony C. Eufemio et al., "The Gold Standard in Crypto-Assets", Digix, Whitepaper, Jan. 2016, 22 pages.
Antonopouls, Andreas; "Mastering Bitcoin—Unlocking Digital Cryptocurrencies", Mastering Bitcoin, Dec. 20, 2014.
Chain Protocol Whitepaper, Apr. 25, 2017, 9 pages.
Examination Report, from EP Application No. 18183703.0, Oct. 23, 2019, EP.
Extended European Search Report, from EP 18183703.0, Nov. 6, 2018.
Flavon, Charlon; Open Assets Protocol, Github, Nov. 17, 2015.
Roger Aitken, "Digital Gold 'Done Right' with DigixDAO Crypto-Trading on OpenLedger", Forbes, Apr. 23, 2016, 12 pages.
Satoshi, Nakamoto; "Bitcoin: A Peer-to-Peer Electronic Cash System", http://nakamotoinstitute.org/static/docs/bitcoin.pdf, Oct. 31, 2008.

* cited by examiner

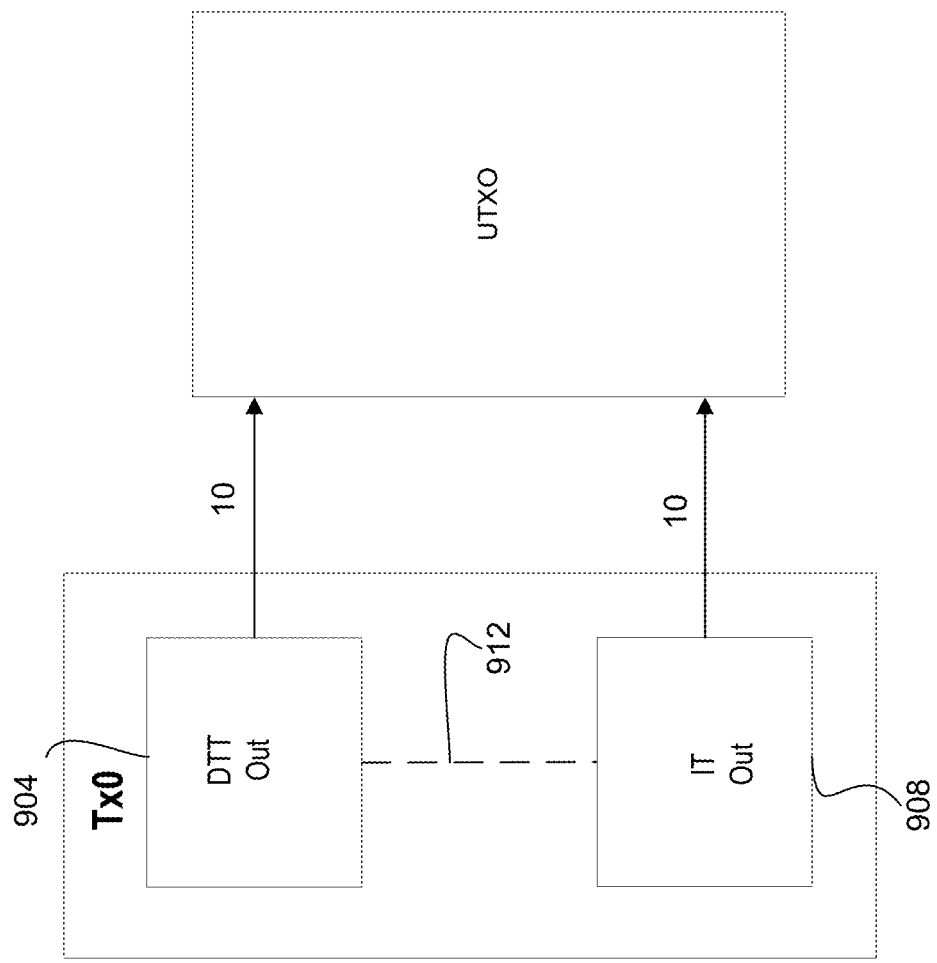

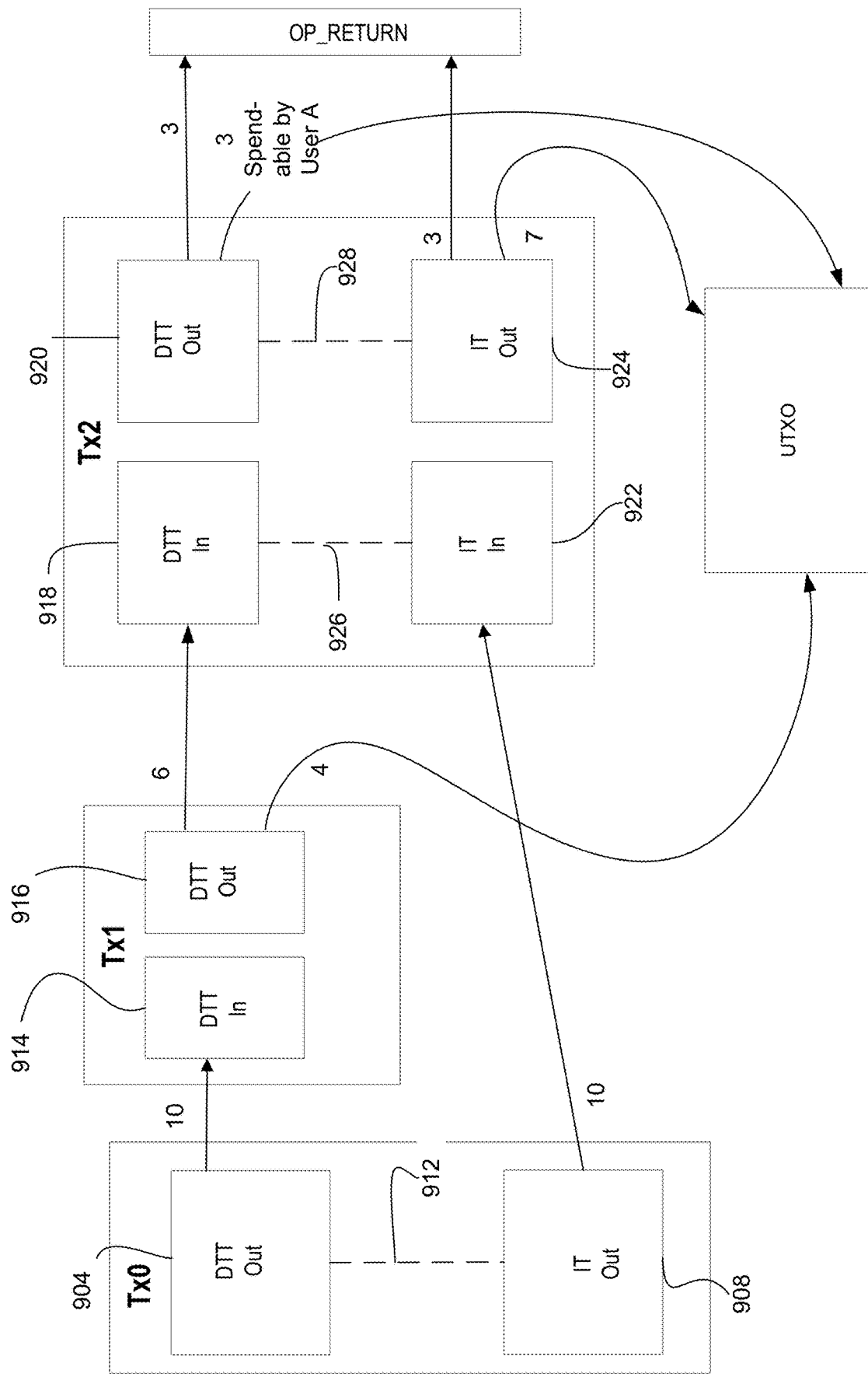

BLOCKCHAIN INCLUDING LINKED DIGITAL ASSETS

CROSS REFERENCE TO RELATED APPLICATIONS

This application is a continuation under 37 C.F.R. § 1.53(b) of U.S. patent application Ser. No. 15/655,227 filed Jul. 20, 2017 now U.S. Pat. No. 10,839,379, the entire disclosure of which is incorporated by reference in its entirety and relied upon.

BACKGROUND

Various electronic mechanisms are used for storing data which multiple parties need to access, modify and/or maintain, including electronic ledgers and database managements systems.

A ledger may be a collection of entries (obligations, assertions, debts, credits, etc.) in a notebook or other physical or electronic form and are akin to a transaction log whereby the current "state" of a ledger may be ascertained by netting or otherwise totaling all of the entries up to the current time period. For example, "Party A loans $X to Party B" could be an entry representative of a transaction in a ledger. "Party B repays $X to Party A" may be a subsequent entry of another transaction in that ledger. The net result of these two entries is the extinguishing of the debt of B to A. Ledgers typically utilize double-entry book keeping whereby separate ledger entries, or separate ledgers, are maintained for each side (account/party) to a transaction and transactions are recorded as a pair of opposing transactions, e.g. credits vs. debits, to each respective account/party, either in the same ledger or in separate ledgers, each maintained by the respective party.

Ledgers may be held by individual parties, or ledgers may contain entries for multiple parties and be replicated/distributed amongst a variety of sources. A ledger which comprises many distributed copies may be referred to as a replicated ledger. An example of an electronic replicated ledger is the "blockchain" methodology employed, for example, by the Bitcoin digital currency. Blockchain is an electronic replicated ledger in which transactions, such as those involving the cryptographic currency Bitcoin, are recorded and stored in chains of blocks including the transactions.

A blockchain database is implemented by software, which may be referred to as blockchain software, which is executed by each computer client, which may be referred to as a node or miner, which is participating in the particular overall system, e.g. digital currency payment system, for which the data stored in the blockchain is being used, e.g. to track payments of digital currency, etc. Generally, the software running on each node maintains a copy/replica of the blockchain data/database. The combination of the blockchain database and the software which maintains it may collectively be referred to simply as a blockchain or a replicated blockchain. The data stored in a blockchain is typically coalesced, collected or grouped together, such as on a quantitative and/or periodic basis, into blocks where each block is coupled or linked, such as in a cryptographic manner, with a prior block forming a chain of blocks which may continue to grow as new data is added.

Each of the replicated blockchains communicates with the others via a network, such as the Internet. It will be appreciated that the term network, in addition to referring to the communications medium by which replicated blockchains communicate, may also be used to refer to the collection of blockchain clients which are implementing a particular system using a blockchain database for data storage and other functions, which may also be referred to as a blockchain network, or for example, in the case of the Bitcoin implementation of a blockchain, the Bitcoin network.

The blockchain software further implements particular rules for allowing/validating modifications, e.g. addition of new transactions, to the blockchain database by the operator of the particular client as well as for validating and implementing modifications to the blockchain database received from other clients. These rules are generally defined by the type of system the blockchain network is being used to implement, e.g. a system for payment of digital currency, and are coded into the software. In order to change these rules, the software should be updated.

For example, one implementation of a blockchain network is Bitcoin which is a system for digital payment transactions, which may be referred to as the Bitcoin network. Generally, users wishing to make or receive payments of a digital currency, called Bitcoin, construct transaction messages which document a transaction, e.g., the payee, the payor, the amount to paid/received, source(s) of funds, a script detailing a cryptographic authentication from one or more parties authorized to allocate the funds, etc. The transaction is then submitted to the Bitcoin network for validation, e.g. to confirm available funds, authenticity of the payor, etc. Each node of the network receives the transaction and executes the rules implemented by the Bitcoin blockchain software to validate the transaction, e.g. ensure the payor has unspent funds (calculated from previous unspent transaction outputs) to cover the transaction and that no one is trying to spend the same Bitcoins twice, and then, if validated, record it in the blockchain database and notify other nodes of the modification thereto.

A blockchain network may include miners and nodes. A node may contain a portion of the blockchain (partial node) or the whole blockchain (full node). The node may be configured to check if new transactions are acceptable, and or for example, to check that number of Bitcoins that currently are available for an address. A miner may be configured as a separate entity or as a node as above (with complete or partial data of the blockchain) that creates new blocks that confirm transactions. The new blocks, if found by a miner, are added to the blockchain and are made available (published) on the nodes. Miners are configured to find the new blocks using an algorithm and earn a reward for found blocks. Miners are thus incentivized and rewarded for their effort via the award of a defined amount of Bitcoins for being the first to complete the validation/blockchain modification process, which, by design is a non-trivial process. A blockchain network may include a plurality of miners, a plurality of nodes, and a plurality of mining nodes, e.g. nodes that are also configured as miners. The plurality of nodes may run node software, the miners may run mining software, and the mining nodes may run a combination of the node and mining software. The term "blockchain client" may be used herein to describe miners, nodes, or mining nodes. The term "blockchain software" may be used herein to describe mining software, node software, or mining node software.

In particular, in the Bitcoin blockchain, a block may only be added by solving a cryptographically defined computation based on the data to be stored in the block, data related to the prior block and an arbitrary value selected by the miner with a result of the computation having to meet specific requirements in order to be accepted. As the necessary computations take time and it may take many attempts by the miner to achieve a suitable result, in conjunction with the reward for success, the Bitcoin blockchain creates a competitive environment in which miners compete, e.g. using computing power, to be the first to successfully add a new block to the blockchain.

The Bitcoin blockchain operates completely transparently, so all data is transmitted to, and is readable by, all participants in the Bitcoin system. That is, each party in the Bitcoin system, with some exceptions, maintains a copy of the ledger, stored by the blockchain, in which all transactions are recorded, referred to as "full replication." In the case of Bitcoin, this replicated ledger makes all transaction "open transactions" and viewable by all participants on the blockchain network and is a necessary property required to prevent double spending of Bitcoins, i.e., parties attempting to send the same Bitcoin to multiple parties. This property of visibility of all transactions in the Bitcoin network is also a drawback of a blockchain, because it does not allow for the confidentiality of transactions. Every participant in the Bitcoin network has access to every transaction on the blockchain. This facilitates the ability to track digital assets, e.g. Bitcoins. The integrity of transactions recorded in each ledger may be cryptographically protected, i.e. "signed," via a transacting party's or parties privately held cryptographic key(s). The transactions of funds from an address may require authorization from one or more parties that may sign, e.g. give authorization, through use of one or more cryptographic keys. In certain transactions, multiple parties may be required to authorize allocation of funds. For example, for a multi signature address, two or more parties may be required to authorize allocating funds from the address. Additional, more complex options may require certain conditions to be met for one of the two or more parties to provide authorization. In an example, a multi signature address may require that two out of three parties authorize transactions, or three out of five, or five out of seven, etc. In a scenario that only a single signature is used, if someone were to steal a blockchain/Bitcoin user's private key, the thief could have all of the information necessary, e.g. the transactional record and a cryptographic key thereto, to be able to see all of the transactions to which the user is a party, and the thief would be able to create transactions using the private key without the true owner of the private key's consent. Multiple signatures, as described above, may help prevent theft by requiring that the transaction be signed by multiple keys and as such require the thief to possess each key in order to authorize transactions.

Using the replicated ledgers of blockchain along with cryptographically linking/chaining the transactions stored therein enables all users to ensure the reliability of the transaction data, i.e. that transactions are recorded accurately and subsequent thereto, protected from alteration, as each user has a copy of all of the transactions and any unintended alterations to a transaction, e.g. via errors or fraudulent activity, are readily detectable via both the cryptographic discrepancies within the chained transactions that would be created as well as the discrepancies that such alterations will create among the various copies of the blockchain ledger.

Financial instrument trading systems are one example of complex systems that utilize databases according to a System of Record ("SOR") model and which may be implemented using blockchain as described above. Generally, a financial instrument trading system, such as a futures exchange, referred to herein also as an "Exchange", such as the Chicago Mercantile Exchange Inc. (CME), provides a contract market where financial instruments, for example futures, options on futures and spread contracts, are traded among market participants, e.g. traders, brokers, etc. Futures is a term used to designate all contracts for the purchase or sale of financial instruments or physical commodities for future delivery or cash settlement, and which are traded on a commodity futures exchange. A futures contract is a standardized legally binding agreement to buy (long) or sell (short) a commodity or financial instrument at a specified price at a predetermined future time. An option is the right, but not the obligation, to sell (put) or buy (call) the underlying instrument (for example, a futures contract) at a specified price within a specified time. The commodity or instrument to be delivered in fulfillment of the contract, or alternatively the commodity, instrument or reference for which the cash market price shall determine the final settlement price of the futures contract, is known as the contract's "underlying" reference, instrument or commodity, also referred to as the "underlier." The terms and conditions of each futures contract are standardized as to the specification of the contract's underlier, the quality and quantity of such underlier, delivery date, and means of contract settlement, i.e. physical delivery or cash settlement. Cash Settlement is a method of settling a futures contract whereby the parties effect final settlement when the contract expires by paying/receiving the pecuniary loss/gain of the contract, e.g. by comparing the contract price to the market price or other reference price of the underlier at the time of settlement, related to the contract in cash, rather than by effecting physical delivery, i.e. the actual exchange of the underlying reference or commodity at a price determined by the futures contract.

Typically, the Exchange provides for centralized "clearing" by which all trades are confirmed and matched, and open positions are settled each day until expired (such as in the case of an option), offset or delivered. Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

A "Clearing House," which is typically an adjunct to the Exchange and may be an operating division thereof, is responsible for settling trading accounts, clearing trades, collecting and maintaining performance bond funds, regulating delivery, and reporting trading data to market regulators and to the market participants. An essential role of the clearing house is to mitigate credit risk via the clearing process. Clearing is the procedure through which the Clearing House becomes buyer to each seller of a futures contract, and seller to each buyer, also referred to as a "novation," and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a communications network. These "electronic" marketplaces, implemented by, and also referred to as, "electronic trading systems," are an alternative trading forum to pit based trading systems whereby the traders, or their representatives, all physically stand in a designated location, i.e. a trading pit, and trade with each other via oral and visual/hand based communication.

In particular, electronic trading of financial instruments, such as futures contracts, is conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g. instrument, traded on the electronic trading system and generally defines or otherwise represents the state of the market for that product, i.e. the current prices at which the market participants are willing buy or sell that product. As such, as used herein, an order book for a product may also be referred to as a market for that product.

In a futures exchange both trading and clearing may operate under a Central Counter Party ("CCP") model, where the futures exchange functions as a counter party to each trade and to the clearing of each trade, referred to above as a novation. CCPs benefit both parties in a transaction because the parties bear most of the credit risk. In a scenario outside of a financial exchange, where two individuals deal with one another by themselves, the buyer bears the credit risk of the seller, and the seller bears the credit risk of the buyer. Conversely, when a CCP is used the credit risk that is held against both buyer and seller is coming from the CCP. One consequence of a CCP model is that all communication and transactions must flow through the CCP, i.e. the CCP is the SOR, and thus information and trading may only be as fast as the CCP may process it and transmit it out to the interested parties. Records are usually kept by the CCP in a database as the source of truth and communicated to other parties using messaging. The CCP's client, e.g. a clearing member, may further have its own database of at least a subset of these records and periodically, typically daily, may reconcile them with the CCP. Further, the customers of a clearing member may have their own database, necessitating similar reconciliation. This effectively serializes the distribution of data from the CCP to all interested parties and increases the latency thereof.

As will be appreciated, replicated electronic ledgers, such as blockchain, may be used to maintain transactional records reflecting trades, credit, payment etc. Examples of using such electronic replicated ledgers is disclosed in U.S. patent application Ser. No. 15/166,829, entitled "Bilateral Assertion Model And Ledger Implementation Thereof", and Ser. No. 15/166,838, entitled "Bilateral Assertion Model And Ledger Implementation Thereof", herein incorporated by reference in their entireties and relied upon.

BRIEF DESCRIPTION OF THE DRAWINGS

FIG. 9A depicts an example transaction, according to some embodiments.

FIG. 9C depicts still another example transaction, according to some embodiments.

DETAILED DESCRIPTION

Figure 1:
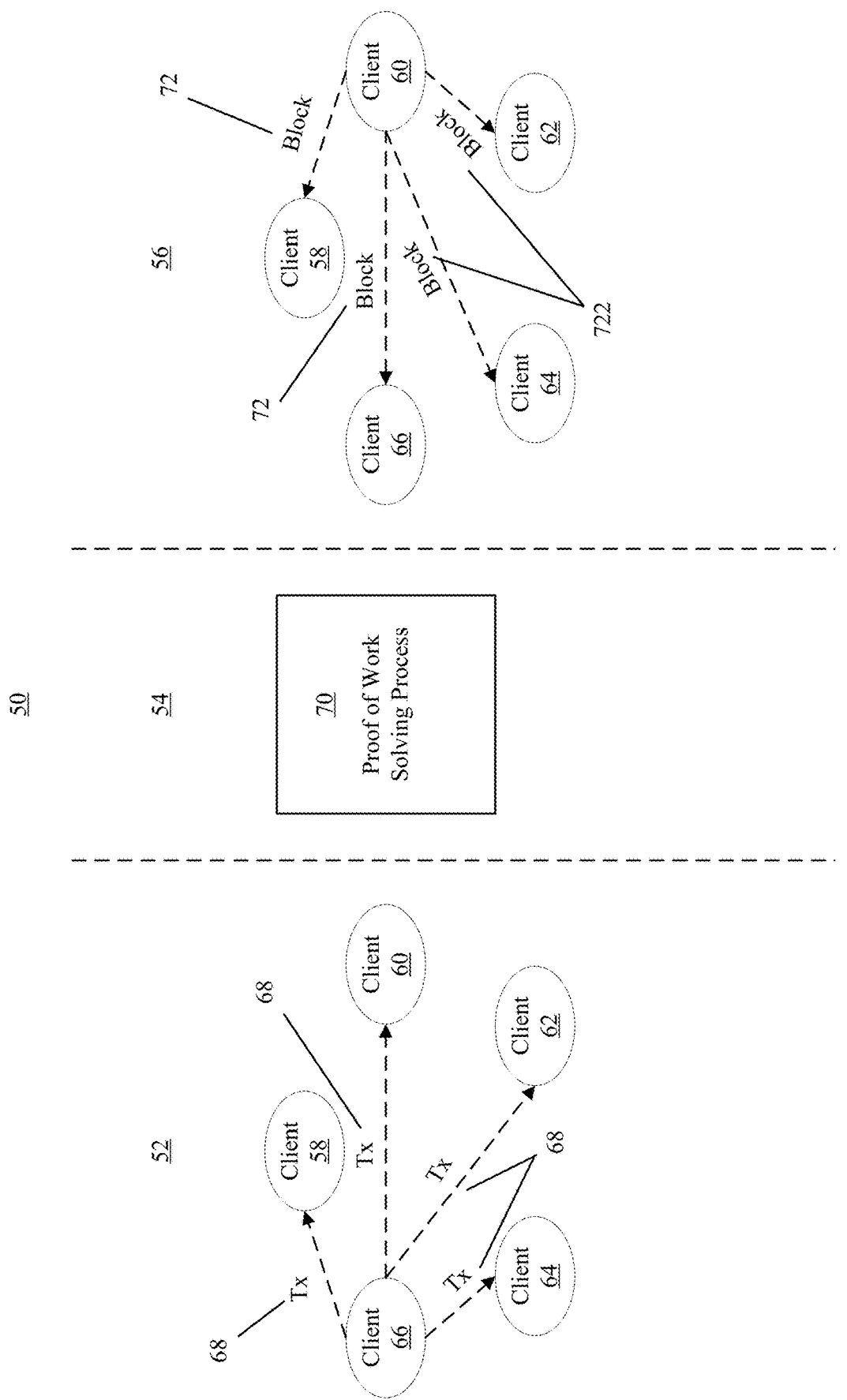
FIG. 1 depicts an example operation of an illustrative implementation of a blockchain, according to some embodiments.

The disclosed embodiments relate to implementation of a blockchain including multiple linked digital assets, where one or more of the digital assets may be associated with one or more physical assets, wherein the digital assets are added to the blockchain in the same transaction, but are independent of each other and are exchanged, transferred, transacted or otherwise spent, used and managed independently of each other, wherein the software implementing each node of a blockchain network may be programmed to ensure that a total quantity associated with the digital assets is synchronized.

In order for a blockchain to function properly, each transaction affecting, or to be stored in, a block may be required to follow one or more validation rules. The validation rules for different transaction types (e.g., creation, transfer, and/or destruction/redemption of a digital asset) may be different. Using existing blockchain technology, the validation rules may be set forth initially and only changed through consensus mechanisms. One example of validation rules may be seen in the Bitcoin protocol, a protocol that uses blockchain technology. Bitcoin generally operates as follows:

1. Users of the blockchain create transactions and submit the transactions.

2. A peer-to-peer network of nodes, each previously programmed with a set of validation rules, relay the transactions, often after validating the transactions.

3. Entities compete to construct the next block in the blockchain, which contains a list of recently submitted transactions not yet included in a block. Using Bitcoin terminology, these are called miners. Each miner selects transactions, checks the transactions for validity, and, if valid, includes the transactions in the next block to be added to the blockchain. This block includes a reference, e.g. a cryptographic hash, of the prior block's header, thus adding a link to that block, hence forming a "chain" of blocks.

4. If a miner succeeds in constructing the next block, the miner utilizes the network of nodes to publish the block to all other nodes and miners.

5. The nodes may validate the block before relaying it, and the miners may validate the block before accepting it.

6. The process repeats, with miners now attempting to create the next block in the blockchain that would link to the newly created block.

This methodology is common across many forms of blockchain technology. Different protocols may differ in their technical protocols, the methods used to determine which entity may add the next block, e.g. proof-of-work, proof-of-stake, Practical *Byzantine* Fault Tolerance, etc. The proposed system described herein is generally applicable to all such blockchain technologies.

The validation rules to add a transaction to the blockchain for Bitcoin are well defined. Examples of such rules for Bitcoin include but are not limited to:

Transaction inputs only spend Bitcoin transactions that are unspent.

The sum of transaction outputs should be less than or equal to the sum of transaction inputs. (Any unspent Bitcoin represents a fee to the miner.)

The transaction should prove, via a script, that it is authorized to spend the inputs; this usually requires one or more digital signatures for each input.

The miner may create a transaction without inputs for a certain amount determined by a mathematical formula (e.g. 12.5 Bitcoin, which will decrease at a later date to 6.25 Bitcoin, etc.) along with the sum of mining fees for all transactions within each block that serves as a block creation reward.

Transaction amounts should be expressed with no more than 8 decimal places.

The total block size cannot exceed 1 MB.

All blockchain clients (e.g. miners and/or nodes) validating transactions or blocks should agree upon the rules that define whether a block is valid. If, for example, a blockchain client includes a transaction in block 123 that has an input that was spent (e.g. no longer available) in a prior block, then other blockchain clients may refuse to relay the block, and any blockchain client seeing that block may choose not to accept it. In this example, blockchain clients will attempt to create, according to the rules a different block 123 that does not include the invalid transaction. On successful mining, i.e. upon computation of an acceptable result according to the rules, the block will be relayed and accepted, and miners will work to create block 124 that links to the correct block 123 in the chain. Because the vast majority of miners agree on the rules, the miners will produce a longer chain of blocks based on valid transactions, and this will rapidly overtake the chain produced by the miner that mined the invalid block 123. The Bitcoin network prefers the longest valid chain, so this process generally results in a chain containing only valid transactions according to the rules the vast majority of miners use.

FIG. 1 depicts an example operation of an illustrative implementation 50 of the Bitcoin blockchain which may be used to track the logical movement of digital assets among the participants, e.g. Bitcoins, and which may include three stages of operation as shown, a transaction stage 52, a proof of work stage 54, and a block confirmation stage 56. FIG. 1 also shows blockchain clients 58, 60, 62, 64, and 66, representative of participants in the Bitcoin blockchain, e.g. miners, nodes, or mining nodes. In the transaction stage 52, blockchain client 66 communicates a transaction 68 to every other blockchain client. A transaction may consist of one participant to the transaction at a blockchain client sending a Bitcoin to another participant to the transaction at a different blockchain client. As the other blockchain clients 58, 60, 62, 64 receive transaction 68, the transaction is validated and then grouped together with other prior transactions into a block. A block may include a number of transactions. A block may also contain just a single "coinbase" transaction that awards a number of Bitcoins to a blockchain client. A block may be opened once a proof of work solution to a prior block is found, either by a blockchain client 48, 60, 62, 64, 66 solving proof of work 54, or a blockchain client 48, 60, 62, 64, 66 being informed of another blockchain client having found a valid block. A blockchain client may begin doing proof of work with or without a single transaction. As more and more transactions arrive, the blockchain clients, e.g. miners will try to fill the block they are trying to solve with these transactions. When the miners hit a limit, the miners continue, although new transactions that arrive may replace older transactions in the block the miners are trying to solve if the new transactions offer higher miners' fees.

During the proof of work stage 54, blockchain clients 58, 60, 62, 64, and 66 that have begun the proof of work solving process 70 will attempt to solve a mathematical equation which allows the blockchain clients 58, 60, 62, 64, and 66 to confirm the veracity of the block via validation of a solution to the mathematical equation. The mathematical equation to be solved is asymmetric, i.e. it is an equation which is difficult to solve, e.g. resource/time intensive, but where the solution is easy to validate, such as the computation of a particular hash value. Once one of the blockchain clients 58, 60, 62, 64, and 66 confirms the veracity of a block, the solving blockchain client 58, 60, 62, 64, and 66 broadcasts the confirmed block to every other blockchain client 58, 60, 62, 64, and 66 at the block confirmation stage 56. As shown in the exemplary operation depicted in FIG. 1, miner 60 of the blockchain clients completed the proof of work involving the transaction 68, and broadcasts the block 72 to each other node of the blockchain clients.

Each of the transactions processed and added to the blocks are checked against the validation rules described above to verify that the transactions are proper. Bitcoin, and most other blockchain technologies, implement these rules in source code in the blockchain software that is used by the miners and/or nodes, e.g. each blockchain client stores the rules in local software. Changing the rules requires that a near unanimous number of blockchain clients should accept and run the updated software. Otherwise, a "fork", i.e. different clients adding a different version of a block at the same location in the blockchain thereby creating a deviation therebetween, may occur.

The validation rules for a blockchain have been difficult to change. Bitcoin, for example, is a decentralized digital currency with no defined authority that is empowered to change the validation rules. This type of blockchain technology is referred to as a public blockchain. Rule changes are difficult to achieve, and doing so requires both near unanimous consensus as well as near universal software updates to prevent the above described types of fork scenarios. For implementing a syntax for altering rules by which a blockchain is operated, see U.S. patent application Ser. No. 15/392,389, entitled "Systems And Methods For Blockchain Rule Synchronization" and filed on Dec. 28, 2016 ("the '389 Application"), the entirety of which is incorporated by reference herein and relied upon.

Alternatively, blockchain technology may be applied to digital assets where more central control is desirable. A blockchain controlled by a central party may cover a wide range of applications across many industries. A centrally controlled blockchain may allow for alteration of the validation rules by a single party. One alternative to a public blockchain that is centrally controlled by an entity may be referred to as a private blockchain. Another alternative to a public blockchain may be a permissioned blockchain where different entities are given different rights to interact with and use the blockchain. For example, some entities may be allowed to write and read data, whereas other entities may only be able to read the blockchain.

An example of a private and/or alternatively, a permissioned blockchain, is a blockchain used to record transactions associated with the creation, transfer and spending of a digital asset, namely, a digital tradeable token, that is backed by or is associated with a physical asset characterized by some value, such as a precious metal, e.g., gold. As is known, gold is often utilized as a monetary standard under which the basic unit of currency is defined by a stated quantity of gold and which is usually characterized by the coinage and circulation of gold, unrestricted convertibility of other money into gold, and may be exported and imported for settling of international obligations.

Some existing systems create digital tokens representing gold. However, the digital tokens are typically tied to specific gold bars. Thus, the use of the digital tokens as a unit of exchange for sub-bar sizes becomes difficult. Moreover, if each digital token can only be associated with a specific physical asset, the fungibility of the digital tokens, and thus the convenience offered to users, is reduced. Moreover, such systems do not address problems with unscrupulous issuers who may issue digital tokens without any backing gold bars or without having possession or control of the gold bars that back the digital tokens.

To promote confidence in and increased use of such a digital gold token system, it is important that all of the digital tradeable tokens on the blockchain (or the quantity/weight associated therewith) are backed by physical gold stored in the vault, i.e., that the aggregate weight of gold represented by the digital tradeable tokens is always stored in the vault. This guarantees that any digital tradeable token owner can redeem their digital tradeable token for physical gold (or the physical asset backing the digital tradeable token) at any time (within reasonable parameters), without delay or uncertainty that they will be able to obtain the requisite amount of gold. Any failure by the issuer in keeping the physical gold secure, in guaranteeing that all issued digital tradeable tokens are 100% backed by physical gold, and, in an embodiment, in providing for redemption of digital tradeable tokens for physical gold according to reasonable terms, would result in adverse economic impact to the value of digital tradeable tokens relative to the value of physical gold that they represent.

However, an unscrupulous issuer may have significant economic incentives to not back all of the digital tradeable tokens all of the time with physical gold. The amount of gold in the vault can be regularly audited. Regular audits that can detect when the issuer has not backed all digital tradeable tokens issued with the physical asset may provide a significant disincentive for the issuer to remove gold from the secure vault that should be backing digital tradeable tokens on the blockchain. Regular audits may increase digital tradeable token investor and owner confidence.

However, audits generally occur at discrete points in time, and the issuer often knows the timing of audits in advance. The audits may be performed randomly, but random audits cannot guarantee that the vault always contains the amount of gold associated with the digital tradeable tokens on the blockchain. An issuer could compromise typical auditing systems in a number of ways.

The issuer could issue digital tradeable tokens without owning or depositing the bars of gold in question, auction and collect money for these digital tradeable tokens, and hold said fiat currency. This likely would not be detected until the next audit. And the issuer could eventually purchase and deposit physical gold bars prior to the next audit to cover the shortfall, in which case the audit would not necessarily discover the time period during which the digital tradeable token was not 100% backed by gold.

The issuer could multiply allocate a given gold bar backing digital tradeable tokens to purposes other than backing digital tradeable tokens. This would give one or more additional parties a competing claim to gold that should serve to back digital tradeable tokens exclusively. This would be difficult to detect in an audit, seeing as the auditor can confirm the physical presence of such a gold bar but would not necessarily know if said gold bar were also pledged for another purpose.

The issuer could unscrupulously sell gold without destroying corresponding digital tradeable tokens. This would result in the digital tradeable tokens being backed by less than 100% physical gold. This could be done with the intention that the same amount of gold could be bought and replaced before the next audit, in which case this action might not be discovered by auditors. Or the issuer may sell the gold with no intention of ever replacing it, knowing that this likely will not be discovered until the next audit.

An issuer of the digital tradeable tokens may first deposit physical gold in a secure vault, e.g., a secure physical vault. Per market (e.g., London bullion market) rules, every good delivery gold bar may be stamped with the refiner, the year of manufacture, a serial number, and the assayed fineness. The bar is also associated with a weight on a weight list.

The issuer creates digital tradeable tokens on a blockchain corresponding to the physical gold deposited in the vault, such that one digital tradeable token corresponds to a defined net weight of gold, e.g., a gram, a troy ounce, etc. The issuer may auction the newly created digital tradeable tokens for fiat currencies (e.g. US dollars, pounds sterling, etc.) in which case the issuer receives fiat currency from the winning bidder(s) and transfers ownership of the digital tradeable tokens to the winning bidder(s). Alternately, the issuer may retain some or all of the digital tradeable tokens. The transfer of ownership of the digital tradeable tokens occurs using a transaction on the blockchain.

Digital tradeable token owners can hold the digital tradeable tokens as investments, which can be bought and sold, e.g., on an exchange. The digital tradeable tokens can also function as a digital currency, like Bitcoin, and can be used to pay for goods and services. Transactions between entities are generally recorded on the blockchain. Transactions between customers and exchanges (e.g. depositing digital tradeable tokens with an exchange to trade, or withdrawing digital tradeable tokens purchased on the exchange) can be recorded as transactions between the customer and an exchange omnibus account. Transactions between users on an exchange can be treated as accounting ledger entries within the exchange, and, in varying embodiments, may or may not result in blockchain transactions.

Digital tradeable token owners can liquidate digital tradeable tokens, e.g., by returning them to the issuer in exchange for physical gold, or to another designated party, who will then withdraw physical gold from the vault corresponding to the amount of digital tradeable tokens to be redeemed minus optional fees or premiums. The digital tradeable token issuer then provides the former owner of the digital tradeable token with the physical gold, e.g. in bar form, or cast as gold coins. It should be appreciated that the issuer may keep an additional inventory of physical gold and/or digital tradeable tokens so that it can handle redemption requests of sizes other than a full bar. However, in all cases, gold withdrawn from the vault should correspond exactly to the amount of digital tradeable token destroyed or redeemed.

Individual digital tradeable tokens correspond to ownership of gold as a whole, and not any interest in any particular bar, so all digital tradeable tokens are fungible with each other. A fungible asset is an asset of such a nature that one part or quantity may be replaced by another equal part or quantity in paying a debt or settling an account. The parts or quantities are interchangeable, or capable of mutual substitution.

In one embodiment, the digital tradeable tokens can be spent in the same way as Bitcoin with transaction inputs and outputs. It should be appreciated that spending a digital tradeable token does not in any way alter the gold bar records listed on the blockchain via inventory tokens. The gold bar records listed on the blockchain via inventory tokens are altered only when adding, removing, or exchanging gold bars, and these transactions are submitted concurrently with transactions to create or destroy digital tradeable tokens such that the digital tradeable tokens will equal the correct net weight of gold.

The disclosed system implements a blockchain that includes a plurality of digital assets. The digital assets may be linked, e.g., either programmatically linked or functionally linked. For example, the consensus rules that control whether an action can be performed on one digital asset (e.g., add the digital asset to the blockchain) may depend upon, or be based upon, the values of the other digital asset. For example, one of the digital assets may be a digital tradeable token that can be used as currency. Another of the digital assets may be an inventory token that includes information about the physical asset (e.g., gold bar) that is used to back the digital tradeable token. For example, the inventory token lists information concerning the physical gold bars (per LBMA rules) that are added to the vault and which will back the digital tradeable tokens. The inventory token serves as a record of the identity of each individual gold bar backing the digital tradeable tokens.

When the issuer creates digital tradeable tokens on the blockchain via a signed transaction, the issuer also creates an additional digital asset, the inventory token, that lists the information described above concerning the physical gold bars added to the vault that will back the digital tradeable tokens. This second type of digital asset does not necessarily have an owner associated with it and is not transferred between parties. The purpose of this digital asset is to serve as a record of the identity of each individual gold bar backing the digital tradeable tokens.

Each digital tradeable token represents a share of ownership, denominated by weight, of the entirety of the gold backing the digital tradeable tokens, and are not limited to or otherwise associated with the specific bar(s) mentioned in the transaction where the digital tradeable token was first created. Therefore, all digital tradeable tokens are fungible with each other.

Once the digital tradeable token and the inventory token have added to the blockchain, the digital tradeable token may be transferred amongst different users. The inventory token, however, is not associated with an owner and is not transferred between users.

The new digital tradeable token and its associated inventory token are added to the blockchain in the same block, i.e., at the same time. The blockchain block can serve as an immutable record demonstrating that the change in quantity of digital tradable tokens corresponds to the change in weight of physical gold represented by changes to the inventory tokens.

In one embodiment, the validation rules require that at least some of the data stored in the linked digital assets satisfies a predetermined equation. For example, the disclosed embodiments may only allow creation of a digital tradeable token if the transaction that generates or creates the digital tradeable token also includes an inventory token, wherein the quantities associated with the digital tradeable token and the inventory token are equal. Thus, in one embodiment, the system only allows the issuer to add a new block to the blockchain if the digital tradeable token quantity being added equals the inventory token quantity being added. In one embodiment, the system prevents addition of a new block if an inventory token lists a refiner, year and serial number that is currently active (e.g., continues to back one or more digital tradeable tokens on the blockchain) in an inventory token on the blockchain. A gold bar corresponding to a serial number could be used to back digital tradeable tokens, then cease to back the digital tradeable tokens, and could then be re-used to back digital tradeable tokens. When the gold bar corresponding to a serial number ceases to back digital tradeable tokens, the inventory tokens initially added to the blockchain may be destroyed, or otherwise marked as inactivated.

The disclosed embodiments may additionally or alternatively calculate and maintain a sum of all of the quantities associated with the digital tradeable tokens and the inventory tokens on the blockchain. The transactions recorded on the blockchain are secure and immutable. All of the digital tradeable tokens and the inventory tokens on the blockchain are publicly available for inspection. Any refiner, member of the public, auditing agency, vault owner, etc. can easily determine what should be, or should have been, the total weight of physical gold in a vault at any point in time.

In the disclosed system, specific digital tradeable tokens are associated with specific inventory tokens (which are associated with specific gold bars) when the digital tradeable tokens are created/added to the blockchain. The digital tradeable tokens are not thereafter limited to or otherwise associated with any specific inventory tokens (and thus are not thereafter limited to or otherwise associated with any bar(s) mentioned in the inventory token transaction where the digital tradeable token was first created). Therefore, all digital tradeable tokens are fungible with each other.

If a user wishes to redeem digital tradeable tokens for physical gold, the issuer removes the corresponding weight of physical gold from the vault, destroys/inactivates the digital tradable tokens being redeemed, and destroys/inactivates inventory tokens corresponding to the serial number(s) of the bar(s) removed. In one embodiment, instead of destroying inventory tokens corresponding to the serial number(s) of the bars removed, the issuer may instead record a new transaction on the blockchain that destroys the corresponding weight in digital tradeable tokens and records which serial numbers were removed in the inventory token.

For example, when the disclosed embodiments are implemented, users can verify that each bar in the inventory token distributed ledger has a unique identification (e.g. refiner, date, and serial number) to ensure that no bar is listed twice, do the math to convert gross weight and fineness to net weight, optionally compute a weight conversion, such as troy ounces to grams, and can then compare this result with the sum of all digital tradeable tokens issued and outstanding on the blockchain. Alternatively, this inspection could be part of the blockchain consensus/validation rules.

When the disclosed embodiments are implemented, the information about which specific physical assets (e.g., identifiable information stored in the inventory token) were added to the blockchain when a digital tradeable token was added (e.g., digital tradeable tokens that back physical assets) are always available on the blockchain. Thus, an issuer may be deterred from issuing digital tradeable tokens without owning the physical assets backing the digital tradeable tokens. The digital tradeable token/physical asset issuer cannot issue digital tradeable tokens without knowing exactly what gold bars they intend to place in the vault (e.g., the physical assets that back the digital tradeable tokens). Any deviation can be easily detected at the next audit, even if the total gold quantity matches. Moreover, even gold refiners can compare the list of physical assets against their own records and implicitly or explicitly affirm that the information on the blockchain matches bars that they refined, including their record of fineness and weight. The issuer cannot easily claim bars that were never refined are in their vault backing digital tradeable tokens, seeing as this could be caught at any time by the alleged refiner, without need to wait for a periodic audit. If the issuer falsely claimed to possess existing gold bars that they do not own, they run a high risk of being caught, as the real owner could come forward with the bar in question at any time, along with documentation of its ownership, and make a public claim and/or alert authorities. This would cast considerable suspicion on the issuer. With a highly public list of gold bars backing the digital tradeable tokens easily accessible on a publicly readable blockchain, gold vaults worldwide could check the inventories that they and their depositors hold against this list. The issuer would have a difficult time allocating gold backing digital tradeable tokens for any other purpose, seeing as persons and auditors involved in that other purpose could easily detect that the gold claimed to be used for that other purpose matches gold listed as being added to the vault in a public inventory token transaction without any corresponding record removing it from the vault. The issuer would likely be prevented from selling any gold backing digital tradeable tokens without destroying an equivalent amount of digital tradeable tokens. If they attempted an illicit sale, the buyer, on taking delivery, could see that the gold delivered to them matched gold listed as being added to the vault by an inventory token transaction without any corresponding record removing it from the vault, and could then make a public claim and/or alert authorities.

In one embodiment, one or more of the above-described inspections are coded into the system as validation rules for different message types. If the inspection described above is part of the validation rules, the inspection query does not need to be performed by an interested party. For example, one of the validation rules may require that any change in the amount of digital tradeable tokens equals the change in the amount of inventory tokens in any transaction changing the total balance of either the digital tradeable tokens or the inventory tokens. In one embodiment, the validation rule may require that any change in the amount of digital tradeable tokens equals the change in the amount of inventory tokens after accounting for optional conversions such as fineness and weight units (e.g. troy ounces to grams), in any transaction changing the total balance of either the digital tradeable tokens or the inventory tokens. Another validation rule may require that the same bar, as identified by refiner, year, and serial number cannot be used to generate more than one currently valid/active inventory token.

It should be appreciated that the disclosed embodiments could be applied to digital tradeable tokens of precious metals other than gold, e.g. silver, platinum, and palladium, provided that a unique means of identifying each bar or sponge of metal, such as stamps and a serial number issued by a refiner, exists. The disclosed embodiments also need not be limited to bullion, and may be applicable to digital tradeable tokens representing other items of value, provided that a way of uniquely identifying the items of value exists.

For example, the disclosed embodiments could be applicable to digital tradeable tokens that represent mortgage backed securities. An inventory token could be added to the blockchain when a digital tradeable token representing mortgage backed securities is added to the blockchain. Such an inventory token could identify the asset being mortgaged and other parameters of the mortgage (e.g. the street address of the property, the notional amount of the loan, etc.). If an issuer unscrupulously attempts to sell two unrelated mortgage backed securities, each containing the first mortgage of the same property, such an attempt could be detected immediately by any party examining the public blockchain. Similarly, attempts to include mortgages on properties that do not exist in a mortgage backed security could be determined by any party examining the public blockchain and comparing the information about the mortgages on properties from the public blockchain to public records.

Digix allows exchange of Digix Gold Tokens backed by physical gold. Digix runs on the Ethereum network and requires Ethereum smart contract support. Ethereum allows parties to place "smart contracts", e.g., arbitrary executable code, using a Turing-complete language, onto a blockchain. This code can store and modify data that it stores, as well as executing code that is part of other smart contracts, when executed on the Ethereum Virtual Machine. It can also move a native asset, Ether, on the blockchain. Users can also create their own types of tokens, implemented by smart contracts.

In one embodiment, the disclosed systems include a data message that includes, in the same data message, creation of digital tradeable tokens and inventory tokens of the same amount, as described in further detail below. The disclosed embodiments utilize transactions that are based on input-output comparisons and that include digital tradeable tokens and inventory tokens in the same data message that creates or destroys digital tradeable tokens, and do not use or require smart contract features allowed by the Ethereum Virtual Machine. The disclosed embodiments may use a Bitcoin derived permissioned system rather than the public Ethereum network. Relying on Ethereum smart contract code may be less secure than the disclosed embodiments. Users of Digix should trust that the Digix specific smart contract code will function as intended. Any error or flaw in the Digix smart contract code can cause a substantial financial loss. Security and safety audits are easier to perform on software utilizing transactions that are based on input-output comparisons as described below and that include digital tradeable tokens and inventory tokens in the same data message that creates or destroys digital tradeable tokens. Using a public Ethereum network in multi-party financial implementations becomes difficult, and potentially compromises the security of the network, because it requires executing arbitrary smart contract code originating in other, potentially non-trusted organizations.

Moreover, should a software flaw be discovered and exploited in a permissioned Bitcoin-derived blockchain with well-known validators, as described in some of the disclosed embodiments, such software flaws can generally be corrected by a non-contentious fork. Software flaws that enable users of a system to create digital tradable tokens without gold backing the digital tradable tokens, or transfer digital tradable tokens without authorization, are undesirable. The well-known validators would likely own digital tradable tokens themselves or otherwise have a vested interest in the success of digital tradable tokens, and would therefore be incentivized to correct the software flaw. These well-known validators could agree to install and utilize new software implementing the disclosed embodiments that would correct the original software flaw that allowed the erroneous transaction(s), and effectively roll back such transaction(s), e.g. implement a fork of the permissioned blockchain. Rolling back erroneous Ethereum transactions on the public Ethereum chain would require the consensus of a supermajority of Ethereum validators or miners, many of whom are unknown and may not have any incentive to take action to correct a flawed smart contract.

Figure 2:
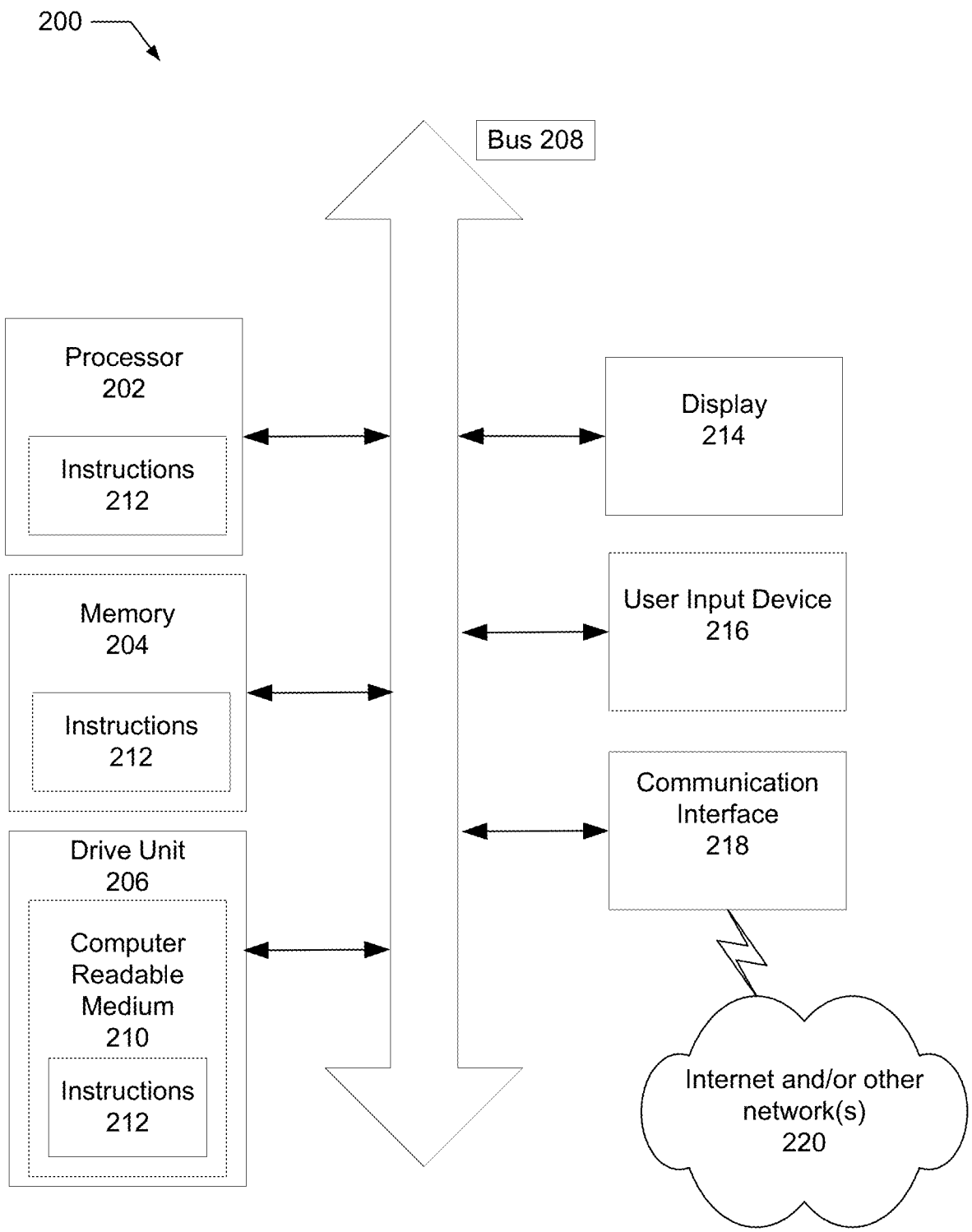
FIG. 2 depicts a general computer system, according to some embodiments.

Referring to FIG. 2, an illustrative embodiment of a general computer system 200 is shown. The computer system 200 may include a set of instructions that may be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 may be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that may communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital versatile disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, may be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 may communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, may be constructed to implement one or more of the methods described herein. For example, the blockchain module 300 (discussed below) may include application specific integrated circuits configured to generate the proof of work. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well. Feedback provided to the user may be any form of sensory feedback, e.g., visual feedback, auditory feedback, or tactile feedback. Input from the user may be received in any form, including acoustic, speech, or tactile input.

Embodiments of the subject matter described in this specification may be implemented in a computing system that includes a back end component, e.g., a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

A system may depend on certain rules, logic, and interrelated objects and data. In technical and computing environments, a system may calculate values for multiple objects subject to rules, e.g., business or environment logic, associated with the objects. The system may identify the rules for calculating or validating business or transactional logic by parsing one or more blocks in a blockchain.

Figure 3A:
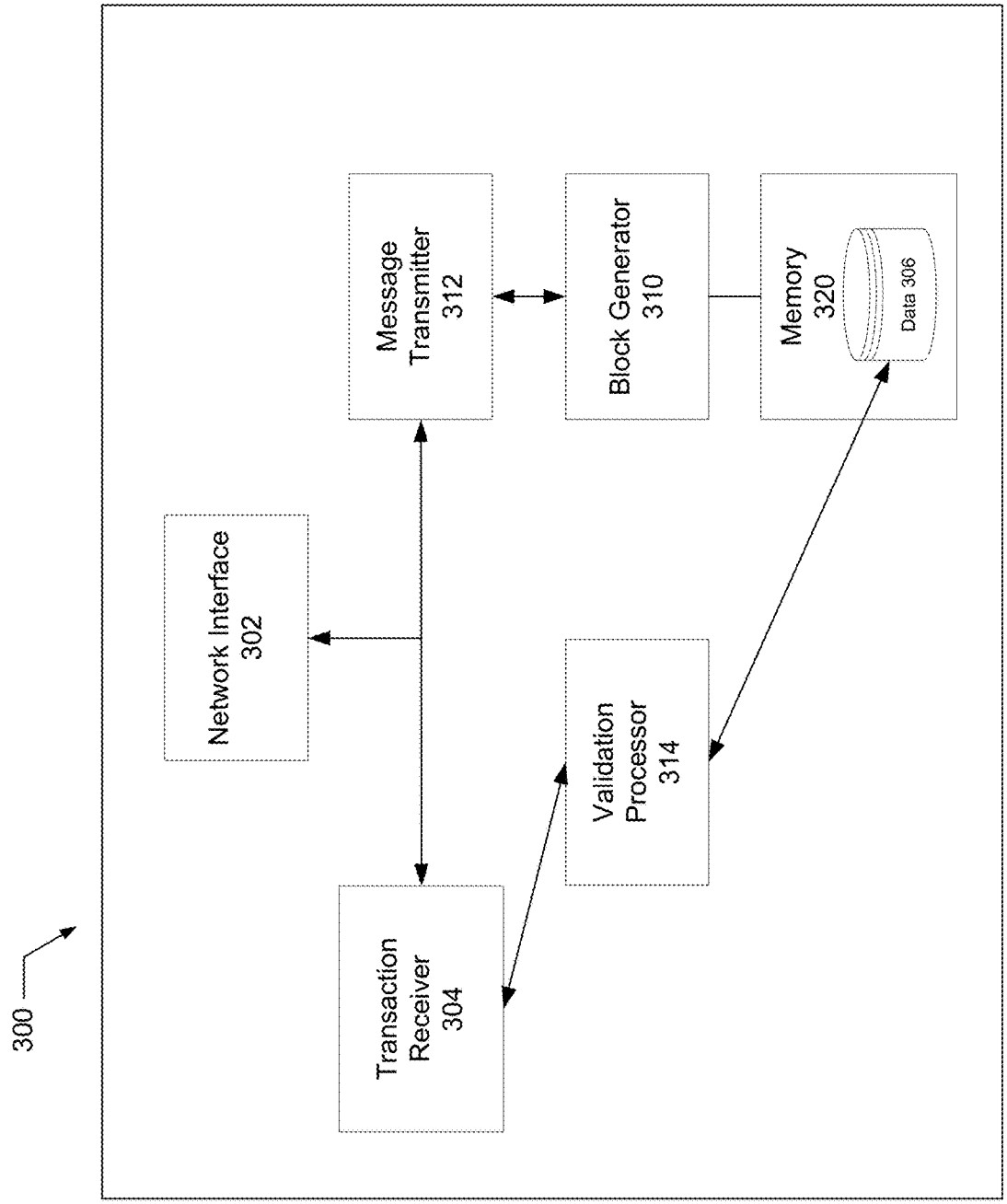
FIG. 3A depicts an illustrative embodiment of a blockchain module, according to some embodiments.

FIG. 3A illustrates an example blockchain module 300, which may be implemented in a computer system such as the computer system described with respect to FIG. 2. The blockchain module 300 may be configured as a blockchain client, e.g. miner or a node in a blockchain system. A blockchain system or network may include a plurality of miners or nodes that maintain a distributed blockchain (or ledger). The blockchain module 300 may be configured as an administrator of the blockchain system and as such, the blockchain module 300 may have permissions to set or alter one or more validation rules by generating and transmitting a signed data message including the one or more changes to the validation rules for the blockchain. For a multiple signature scenario, the blockchain module 300 may be one of the two or more parties that are required to authorize a transaction or proposed rule change. The blockchain module 300 may store the blockchain and rules for the blockchain in a blockchain datastore. The blockchain module 300 may be configured to update the blockchain by generating or validating received blocks that contain one or more transactions. The transactions may include transactional data that relates to the function or use of a physical asset issuer that provides digital tradeable tokens backed by the physical assets.

The blockchain module 300 may be representative of a blockchain client, e.g. a miner or node and may be configured to run blockchain software that facilitates the validation, generation, and communication of one or more transactions and/or one or more blocks in a blockchain network. The blockchain module 300 includes a network interface 302, transaction receiver 304, a validation processor 314, a block generator 310, and a message transmitter 312.

The network interface 302 is operative to couple the blockchain module 300 with a network, such as a public and/or private communications wired and/or wireless network, and facilitates communications among the miners or nodes in the blockchain network as described herein. The blockchain module 300 may store a data structure 306 of the blockchain in a memory 320. Static and dynamic validation rules derived from data in the blockchain may be stored in the memory 320 in the data structure 306 or in a datastore in the validation processor 314.

The blockchain module 300 includes a transaction receiver 304, coupled with a network interface 302. The transaction receiver 304 is operative to receive a data transaction message from a first participant of the plurality of participants. The transaction receiver 304 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 204 shown in FIG. 2 and described in more detail above with respect thereto, to cause the processor to, or otherwise be operative to receive a data transaction message, described below, from a participant (blockchain client) in the blockchain network. The data transaction message may include data indicative of a request to add, remove, or otherwise modify data stored in the shared data structure (blockchain).

The blockchain module 300 includes a validation processor 314 that is operative to determine based on the set of validation rules if the received data transaction message is valid. The validation processor 314, which may be implemented as a separate component or as one or more logic components, such as on an FPGA which may include a memory or reconfigurable component to store logic and processing component to execute the stored logic, or as second logic, e.g. computer program logic, stored in a memory, or other non-transitory computer readable medium, and executable by a processor, to cause the processor to, or otherwise be operative to, identify one or more rules in a block, a transaction message, or in the data structure 306 of the blockchain. The validation processor 314 may be operative to verify the signature of the transaction. The validation processor 314 may include a verification algorithm that is used to check if a blockchain client sending the message has been signed by the sender.

The blockchain module 300 includes a block generator 310, which may be implemented as a separate component or as one or more logic components, such as on an FPGA which may include a memory or reconfigurable component to store logic and processing component to execute the stored logic, e.g. computer program logic, stored in a memory, or other non-transitory computer readable medium, and executable by a processor, such as the processor 202 shown in FIG. 2 and described in more detail below with respect thereto, to cause the processor to, or otherwise be operative to, generate a block including the validated transaction message. The block generator 310 may be operative to generate a proof of work. The result of the proof of work may be included in the generated block. The block generator 310 may be operative to digitally sign the generated block. A key may be provided by an exchange computer system 100, discussed below, or stored in memory or the blockchain module 300.

The blockchain module 300 includes a message transmitter 312, coupled to the block generator 310, operative to transmit a new data message to the plurality of participants of the blockchain system. The message transmitter 312, which may be implemented as a separate component or as one or more logic components, such as on an FPGA which may include a memory or reconfigurable component to store logic and processing component to execute the stored logic, e.g. computer program logic, stored in a memory, such as the memory 204 shown in FIG. 2 and described in more detail below with respect thereto, or other non-transitory computer readable medium, and executable by a processor, such as the processor 202 shown in FIG. 2 and described in more detail below with respect thereto, to cause the processor to, or otherwise be operative to, generate a data message including data indicative of a transaction or block.

One exemplary environment for using blockchain technology is in financial markets, and in particular, electronic financial exchanges, such as a futures exchange, such as the Chicago Mercantile Exchange Inc. (CME). In particular, an exchange may offer multiple products and contracts for purchase that may be tracked or settled using a distributed ledger. An exchange may use public blockchain technology and dynamic rules to provide a trusted but flexible system for settling trading accounts, clearing trades, or collecting and reporting financial data among others.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as the obligations occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant may have a ripple effect on the solvency of the other participants. Conversely, CME's mark-to-the-market system does not allow losses to accumulate over time or allow a market participant the opportunity to defer losses associated with market positions.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated. Public blockchain technology provides for a trusted mechanism while a dynamic syntax for validation rules provides for the flexibility to efficiently adjust for changes in the market.

Although described below in connection with examples involving frequent flyer mileage, the methods described herein are well suited for tracking values for any variety of objects conforming to a set of rules or relationships, such as for example, determining settlement prices or tracking ownership for a variety of instruments based on a related market. Generally, the disclosed embodiments may be applicable to any computer processing system that is constrained by a variety of rules and data values.

The disclosed embodiments may be applicable to contracts for any type of underlier, commodity, equity, option, or futures trading system or market now available or later developed. The disclosed embodiments are also not limited to intra-market spread instruments, and accordingly may also be used in connection with inter-market spread instruments for contracts associated with different commodities.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets. The disclosed embodiments are also not limited to uses by a clearing house or exchange for purposes of enforcing a performance bond or margin requirement. For example, a market participant may use the disclosed embodiments in other fields or applications.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

Figure 3B:
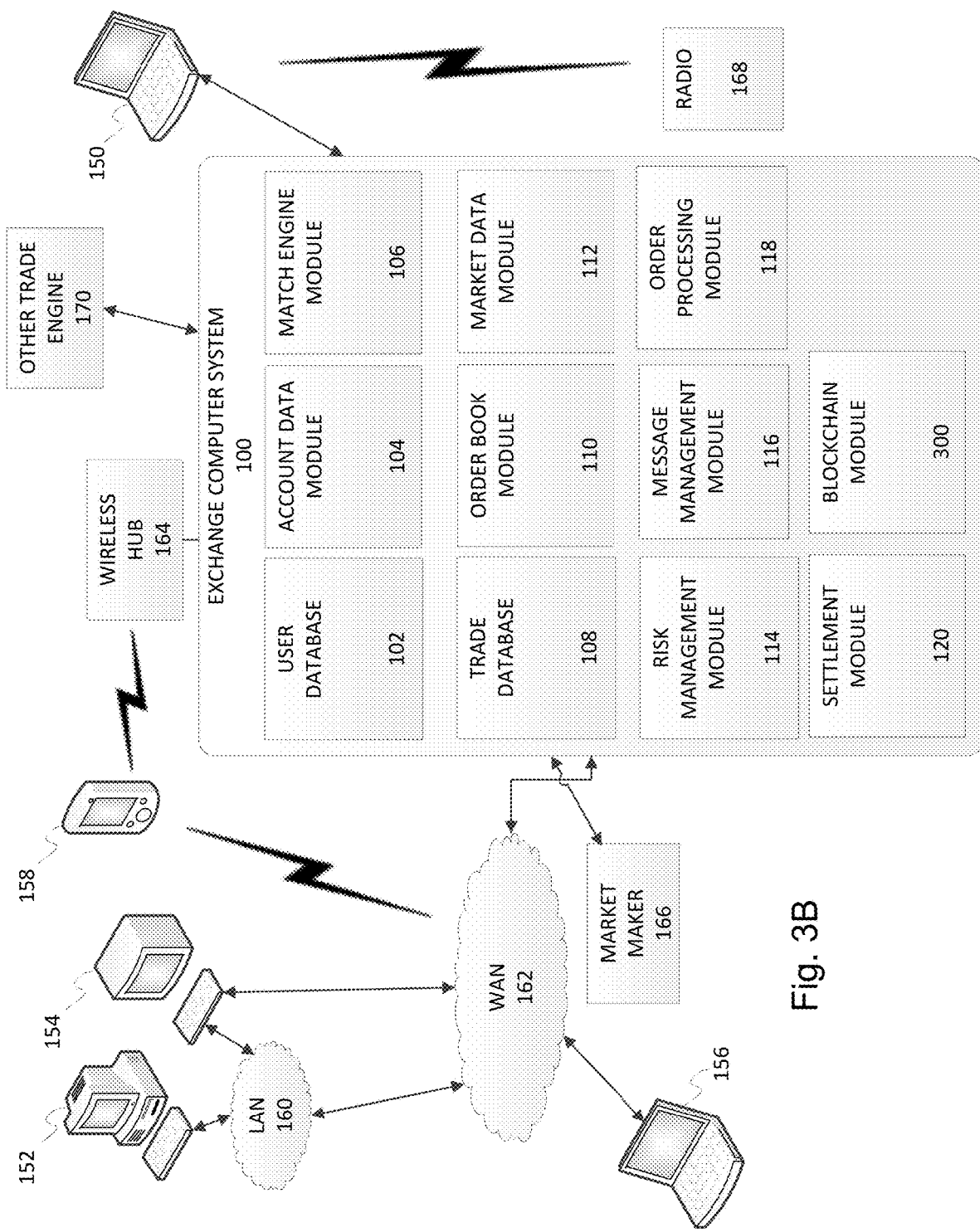
FIG. 3B depicts a computer network system, according to some embodiments.

An exemplary trading network environment for implementing trading systems and methods is shown in FIG. 3B. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

Exchange computing system 100 may include blockchain module 300, as described above.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 3B includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 3B, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 3B also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 3B may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 3B is merely an example and that the components shown in FIG. 3B may include other components not shown and be connected by numerous alternative topologies.

Figure 4:
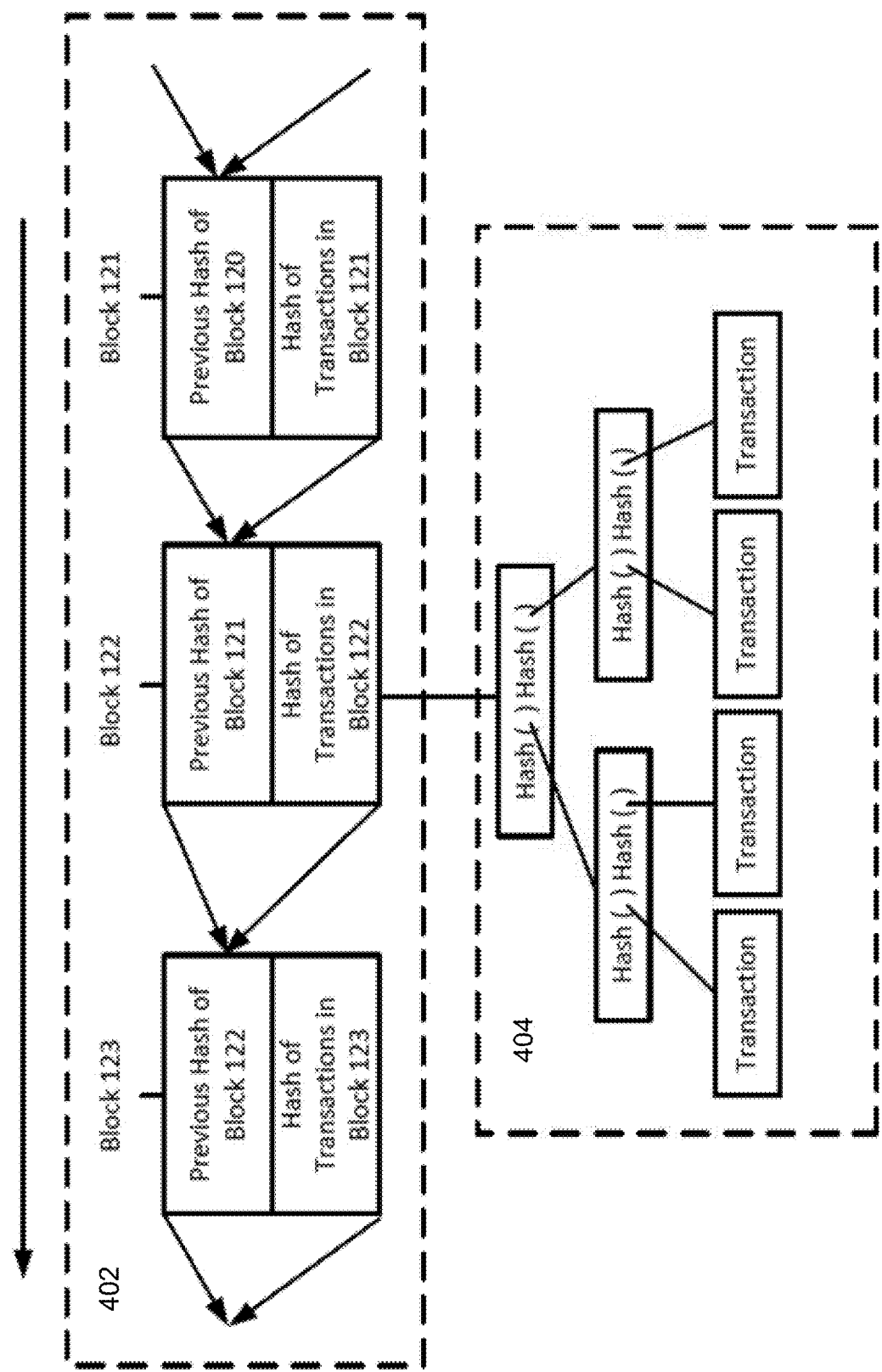
FIG. 4 depicts an illustrative embodiment of a blockchain system.

FIG. 4 illustrates an example blockchain 402 comprising a hash chain of blocks. Each block is connected or "chained" to the previous block by a hash chain. For example, Block 122 contains a reference to the hash of the previous block's header (parent block) in the chain (Block 121). The hash of block 122 is included in block 123 and so on. In this way, the blockchain is linked to the previous block creating a chain. For a given block, all subsequent blocks after that block verify the given block. The given block verifies all the blocks prior to the given block. This allows for a distributed ledger with a high fault tolerance. FIG. 4 also illustrates the merkle root tree 404. Each block contains a merkle hash tree of the transactions included with the block. The Merkle root is a hash of the root of the merkle tree of the block's transactions. A binary tree with hash pointers is known as a Merkle tree. Each transaction is a leaf of the tree. The transactions or leaves are grouped into pairs of two. For each pair, a data structure is built that has two hash pointers, one to each of these leaves. The data structures make the next level up of the tree. The data structures are then grouped into groups of two, and for each pair, a new data structure that contains the hash of each. This process is continued up until there is a single block, e.g. the root of the tree. The root is then hashed and stored in this field.

Figure 5:
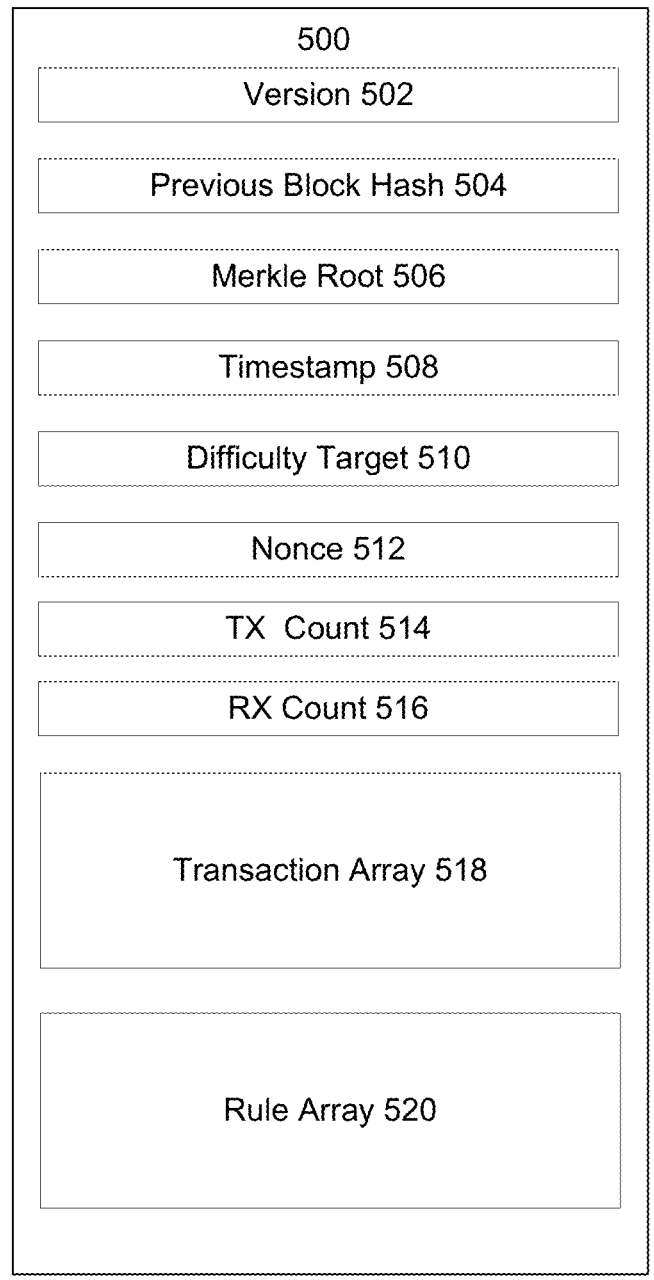
FIG. 5 depicts an illustrative embodiment of a block of the blockchain system of FIG. 4.

FIG. 5 illustrates an example block 500 of the blockchain of FIG. 4. The block 500 may, in one embodiment, share a similar format to a block used in Bitcoin. Alternative formats may be used. For example, the fields that apply to the proof of work in Bitcoin may be different for blockchains that do not use proof of work. Additional fields may be included that include rule changes or indications of rule changes to the validation rules. Certain fields may be excluded.

Block 500 includes a version field 502, a prev_block field 504, a merkle_root field 506, a timestamp 508, a difficulty target field 510, a nonce field 512, a TX (transaction) count field 514, a RX (rules) count field 516, a TX array 518, and a RX array 520.

The version field 502 contains a number that is used to track the software/protocol upgrades for Bitcoin. The Bitcoin software is constantly updated to fix bugs and warnings. Protocol changes such as network protocols are also adjusted as systems change. Major changes to the validation rules may also be updated through software upgrades. The version field 502 provides for new miner and existing minors to easily check to see if their protocol version is up to date. If not, the blockchain clients, e.g. miners and nodes, may download updated software in order to participate in the Bitcoin protocol.

The previous block hash field 504 includes a reference to the hash of the previous block's header in the chain. Hashing is the transformation of a string of characters or bytes of data into a hash (e.g. shorter fixed-length value or key) that represents the original string or data. The hash is substantially smaller than the text or data itself, and is generated by a formula in such a way that it is extremely unlikely that someone could create other different text or data that will produce the same hash. The previous block hash field 504 may contain a hash of the previous block's header.

As described above, the Merkle root 506 is a hash of the root of the merkle tree of the block's transactions. A binary tree with hash pointers is known as a Merkle tree. Each transaction is a leaf of the tree. The transactions or leaves are grouped into pairs of two. For each pair, a data structure is built that has two hash pointers, one to each of these leaves. The data structures make the next level up of the tree. The data structures are then grouped into groups of two, and for each pair, a new data structure that contains the hash of each. This process is continued up until there is a single block, e.g. the root of the tree. The root is then hashed and stored in this field.

The timestamp 508 is the approximate creation time of the block. The timestamp may be used to audit the state of the digital tradeable tokens at any one given point in time, and inventory tokens that list identification information (e.g., serial number) of physical assets (e.g., gold bars) that back up the digital tradeable tokens.

A block in the Bitcoin protocol may also include fields that are directly related to the proof of work algorithm. The difficulty target 510 is the proof-of work algorithm difficulty target for the block. The Nonce 512 is a counter used for the proof of work algorithm. The Bitcoin protocol uses proof of work to avoid issues of network abuse. Proof of work is a mechanism used to prevent constructing alternative blockchains that may lead to double spending. Proof of work requires an amount of computational work from a participant to arrive at a solution and submit a block. By using proof of work, the Bitcoin protocol can make it prohibitively expensive to generate an alternative blockchain from which double spending could occur. Proof of work or alternatives such as proof of stake or proof of burn may be used in an embodiment. Each of these proofs are attempts to prevent a double spending situation and allow for consensus of the blockchain. As discussed herein, if a format/protocol other than Bitcoin is used the implement the disclosed embodiments, certain fields such as proof of work algorithm fields may not be used.

A block may contain additional data such as the size, height, block index, and the node that generated or relayed the block. Examples of values for the fields in a block are listed below:

"ver":1,
"hash":"0000000000000bae09a7aded75aa67e46cb8393 a8ac1f7acaa5ad94f9eacd103"
"prev_block":
 "0000000000000dca880a6c124e2509577d0f98d9 e12df8952e0439ac7409738a"
"mrkl_root":"935aa0e1e0c995c39e06995ecce7ddbebd 2e29 a4b8b26ed32d550a72e8200bf5"
"time": 1222131230
"nonce":2961215930,
"block_index":618024,
"relayed_by":"112.61.108.165",
"tx":[--Array of transactions--],
"rx":[--Array of rules--].

Figure 6:
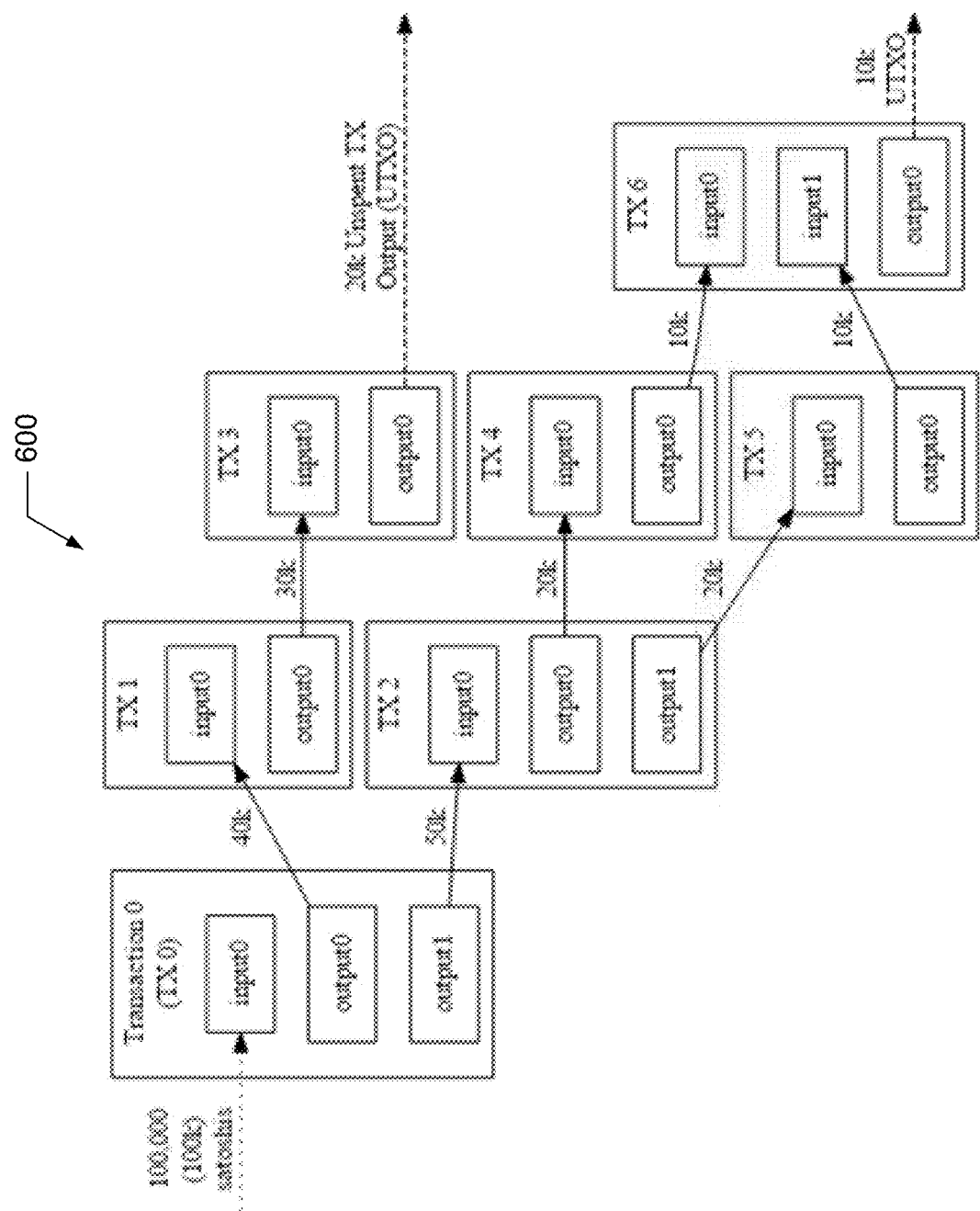
FIG. 6 depicts an example transaction diagram for transactions involving Bitcoin.

FIG. 6 illustrates an example transaction diagram 600 for transactions involving Bitcoin. Bitcoins are transferred via transactions that specify inputs and outputs. Each transaction has at least one input and one output. Each input spends the satoshis (the unit for Bitcoin) paid to a previous output. Each output then waits as an Unspent Transaction Output (UTXO) until a later input spends it. A transaction that generates a new bitcoin may not refer to a prior UTXO. This is a "coinbase" transaction. The input for a coinbase transaction is not validated. Bitcoin miners create coinbase transactions.

The Bitcoin protocol chains transactions together. A single transaction can create multiple outputs, as would be the case when sending to multiple addresses, but each output of a particular transaction can only be used as an input once in the blockchain. Any subsequent reference to a previously reference transaction is an attempt to spend the same satoshis twice (i.e., double spend), which is forbidden in Bitcoin. Outputs are tied to transaction identifiers (TXIDs), which are the hashes of signed transactions. Because each output of a particular transaction can only be spent once, the outputs of all transactions included in the blockchain can be categorized as either Unspent Transaction Outputs (UTXOs) or spent transaction outputs. For a payment to be valid, it should only use UTXOs as inputs.

In the Bitcoin protocol, the transactions are associated with digital assets of the same type, e.g., Bitcoin. Some blockchains, such as the Chain blockchain, involve transactions associated with multiple different asset types, where the total inputs and outputs are always equal for each type of asset.

The disclosed embodiments include a blockchain implementation that stores transactions for multiple different digital assets, namely, the digital tradeable tokens and the inventory tokens discussed herein. The validation rules in one embodiment compare the amount or quantity associated with the multiple different assets that are included or involved in the same transaction.

Figure 7:
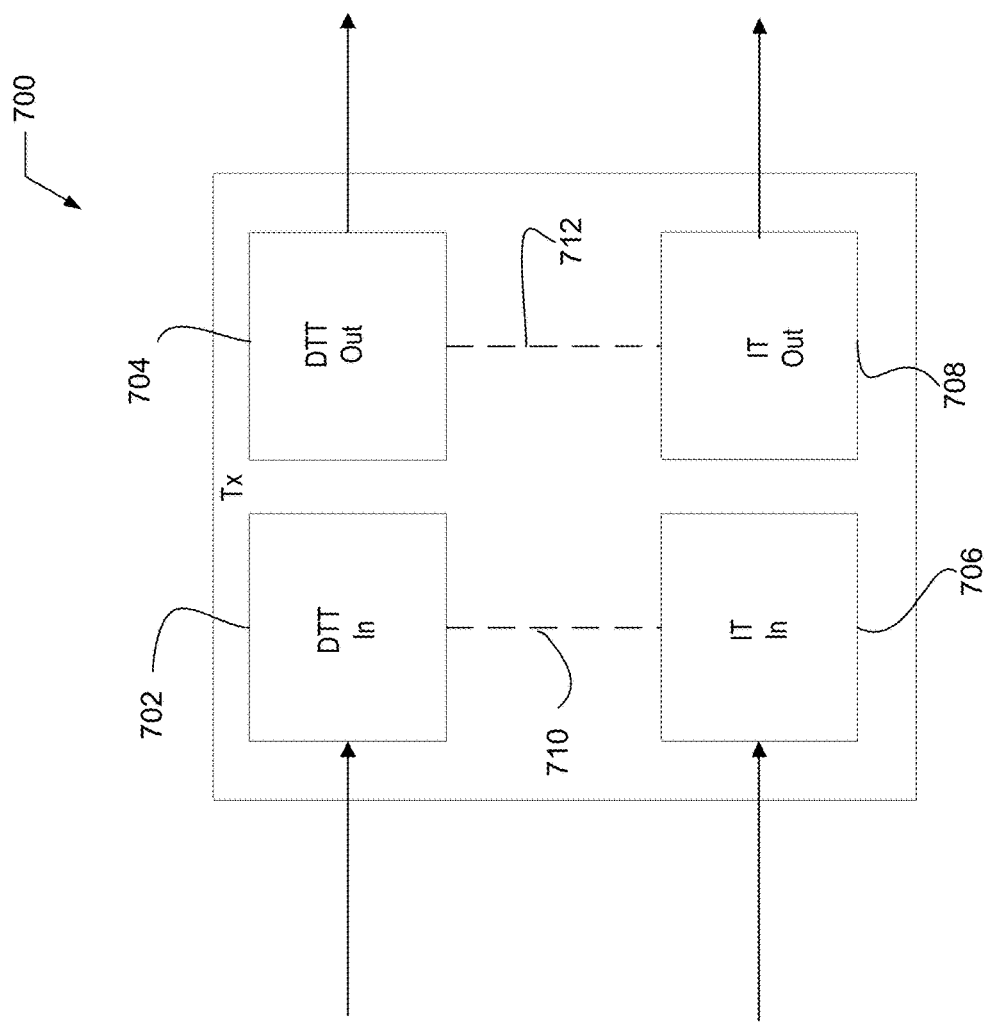
FIG. 7 depicts an example transaction data structure, according to some embodiments.

FIG. 7 illustrates an example transaction data structure 700 for a transaction involving digital tradeable tokens and inventory tokens, according to the disclosed embodiments. The transaction includes digital tradeable token input 702 and digital tradeable tokens output 704. The transaction data structure may also include, depending on the transaction type, inventory tokens input 706 and inventory token output 708, as will be described below.

In one embodiment, the validation rules require inventory token inputs and outputs, depending on the transaction type. In one embodiment, the validation rules require that the amount of inventory tokens added to or destroyed from the blockchain via a transaction relates to the amount of digital tokens added to or destroyed from the blockchain, respectively, via the same transaction according to an equation. As shown in FIG. 7 via dashed line 710, the digital tradeable token input 702 may be linked to the inventory token input 706.

As shown via dashed line 712, the digital tradeable token output 704 may be linked to the inventory token output 708. In one embodiment, linking two inputs together, or linking two outputs together, may include establishing communications between data structures or data fields that store the data being linked, so that the data may be compared by a processor. In one embodiment, users examining the blockchain may be able to audit the data associated with 704 and 708. Whether or not the amount associated with 704 equals the amount associated with 708 in any one given transaction may be enforced by consensus rules such that the transaction is invalid unless the amount associated with 704 equals the amount associated with 708. In one embodiment, the difference between the total non-destroyed 704 Out quantity and the total 702 In quantity should be less than or equal to the difference between the total non-destroyed 708 Out quantity and the total 706 In quantity, regardless of whether tokens are created or destroyed, inventory tokens are modified, or digital tradable tokens are spent. When a digital tradable token is created, 702 equals 706, and 704 equals 708.

It should be appreciated that the transaction data structure 700 may be modified (not shown) for transaction that create a digital tradeable tokens and inventory tokens, e.g., transactions that are similar to coinbase transactions. In such cases, FIG. 7 may be modified so that there are no UTXO inputs (i.e., 702 and 706). The amount associated with 704 would equal the amount associate with 708. A signature or multiple signatures may be associated with the transaction to prove that an authorized party, e.g. the issuer, really did issue or create the tokens.

An operation with both inputs and outputs, as shown in FIG. 7, may comprise a modification of an inventory token. Or, as also shown in FIG. 7, an operation with both inputs and outputs may comprise the deletion of an inventory token if the output uses an OP_RETURN script opcode (operation code), which is used to mark transaction outputs as invalid and unspendable.

The disclosed embodiments accordingly implement a data structure, such as the example data structures associated with FIGS. 7, 9A, 9B and 9C, that enables transactions that include both digital tradeable tokens and inventory tokens (when necessary, e.g., creation or inactivation of digital tradeable tokens) in the same transaction. The validation rules and security rules described herein apply atomically to the entire transaction. Thus, the addition, changing, or removal of digital tradeable tokens and inventory tokens is atomic, e.g., within a transaction, all inputs and outputs should be valid, and all relationships between the quantities should hold, or the entire transaction is rejected. Cryptographic signatures cover the entirety of the transaction, thus guaranteeing that one part of the transaction cannot be modified without invalidating all other parts.

For example, if the same transaction did not include both the digital tradeable tokens and the inventory tokens, the signature in a signed transaction to create just a digital tradeable token would only cover the digital tradeable token, and not any corresponding inventory tokens. Without a signed transaction for the inventory token, someone else (e.g., an unscrupulous party) could then fabricate a new inventory token transaction, e.g., with different serial numbers of the gold bars, purporting to correspond with the digital tradeable tokens associated with the signed transaction.

Figure 8:
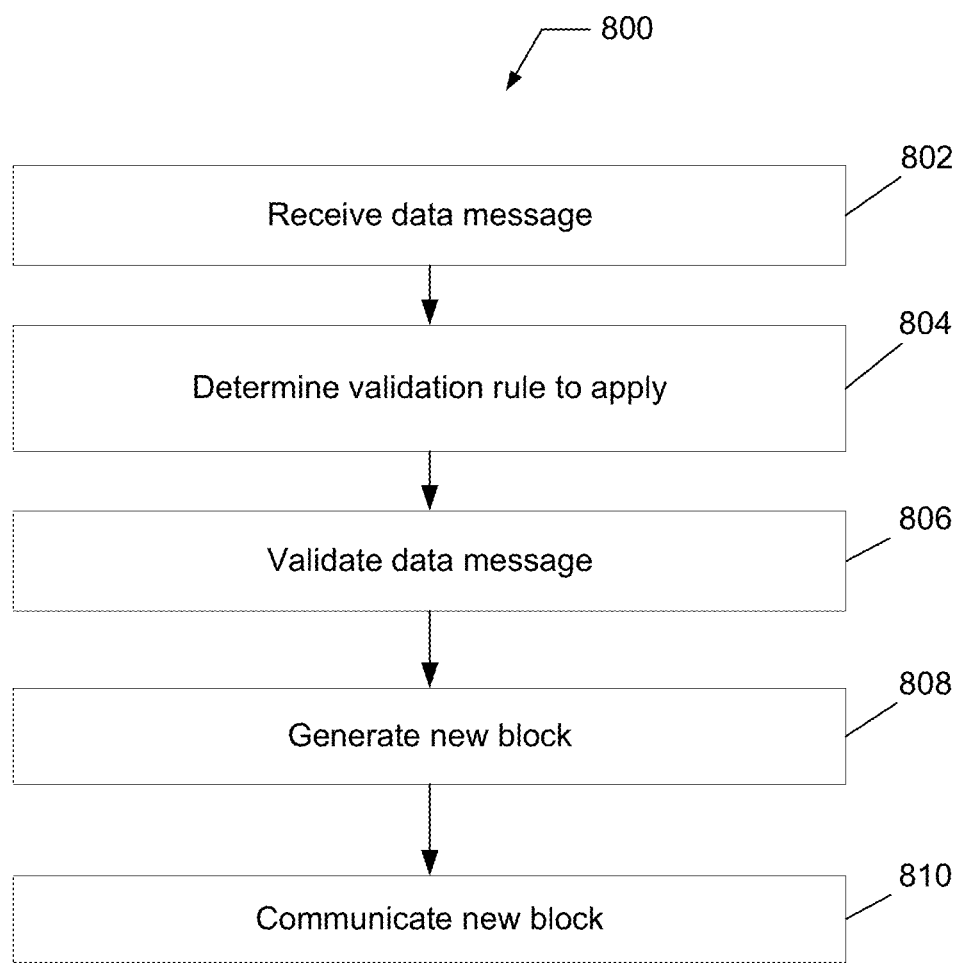
FIG. 8 depicts a high-level flowchart illustrating a method for validating transactions in a blockchain system, according to some embodiments.

The transaction data structure 700 may be implemented in a blockchain, as described in connection with example method 800, illustrated in FIG. 8. FIG. 8 illustrates a method for validating a transaction in a system that implements a blockchain as may be implemented with computer devices and computer networks, such as those described with respect to FIGS. 2 and 3. The method may be implemented by one or more blockchain clients that are participants in a blockchain network. The one or more blockchain clients may include one or more nodes, one or more miners, and or one or more mining nodes. Embodiments may involve all, more or fewer actions indicated by the blocks of FIG. 8. The actions may be performed in the order or sequence shown or in a different sequence.

At act 802, a data message is received that includes a request to perform a transaction related to the blockchain. Generally, a data message may include data indicative of a request to store new data in the data structure management system. The data message may comprise a transaction to be implemented by the blockchain. The transaction message may be received from a participant in the blockchain network. A data message may include metadata that describes the message, e.g., the size of the message, a number of inputs, and a number of transaction outputs. The data message may vary in type. In particular, the data message may be a create digital tradeable token data message, a transfer digital tradeable token data message, or a destroy digital tradeable token data message. Each of creating a digital tradeable token, transferring a digital tradeable token, or destroying a digital tradeable token may be referred to as a transaction, which may be transmitted to a blockchain node within a data message.

A hash of the transaction, later stored in a block, may serve as a unique ID for the transaction. This allows the system to use hash pointers to reference transactions. The transaction may further include a "lock_time" field. If the lock_time field contains any value other than zero for the lock time, the funds (e.g., digital tradeable tokens) may not be spent until the specified lock time. Transaction messages are cryptographically signed records that propose reassigning ownership of digital tradeable tokens to new addresses. Transactions include metadata, input records that reference the funds from other previous transactions, and output records that describe the criteria needed to spend the transferred digital tradeable tokens.

If the data message is a digital tradeable token creation message (i.e., includes a request to create a digital tradeable token), the data message may include both a digital tradeable token and an inventory token. If the digital tradeable token is backed by a physical asset such as a gold bar, the digital tradeable token includes the quantity of gold, e.g., a defined net weight of gold, e.g., a gram, a troy ounce, etc. Thus the digital tradeable token includes an amount/quantity/unit of the digital tradeable token that can be used, e.g., as digital currency, by an owner of the digital tradeable token. It should be appreciated that when the digital tradeable token is created by an issuer, the digital tradeable token may not be associated with an owner. Alternatively, the issuer may associate a newly created digital tradeable token with an owner, e.g., a user, when the digital tradeable token is created on the blockchain. The digital tradeable token information may be stored in the transaction array 518 in a block, such as block 500.

In one embodiment if the data message is a digital tradeable token creation message, the data message also includes an inventory token corresponding to the digital tradeable token. The inventory token also includes an amount/quantity/unit of the physical asset (e.g., gold) that is backing the digital tradeable token which in turn can be used, e.g., as digital currency, by an owner of the digital tradeable token. The inventory token also includes identification information for the physical asset associated with the digital tradeable token. In particular, the inventory token includes identification information for the physical asset, such as a serial number, and also includes the quantity of gold, e.g., a defined net weight of gold, e.g., a gram, a troy ounce, etc. The inventory token information may be stored in the transaction array 518 in a block, such as block 500.

For example, FIG. 9A illustrates example transaction Tx0 which creates 10 digital tradeable tokens (DTT Out). As shown in FIG. 9A, Tx0 also creates 10 inventory tokens (IT Out). Transactions that are unspent are output to an Unspent Transaction Output (UTXO) database. The tokens may be initially authorized by a source, e.g., an issuer, which may involve a transaction similar to a genesis or coinbase Bitcoin transaction. The system may compare, via connection 912, that the quantity associated with the digital tradeable tokens being created or output (904) is equal to the quantity associated with the inventory tokens being created or output (908). In one embodiment, Tx0 is only validated by the blockchain module validation processor 314 if the DTT Out quantity equals the IT Out quantity. In one embodiment, the system may require one or more signatures to prove that the physical gold issuer is the entity requesting digital tradeable token creation.

If the data message is a digital tradeable token spend or transfer message, the data message includes digital tradeable token information needed to spend the digital tradeable token, such as the quantity or weight of the physical asset associated with the digital tradeable token, ownership information (e.g., addresses of the sender and the recipient) and may also include input/output data that specifies the units to be transferred. Thus, a request to spend the digital tradeable token may involve reassigning ownership of the digital tradeable token from one owner to another. Thus, the transaction data for transfer digital tradeable token messages includes ownership information related to how the digital tradeable token is to be spent, and the transaction data is stored in the transaction array.

Figure 9B:
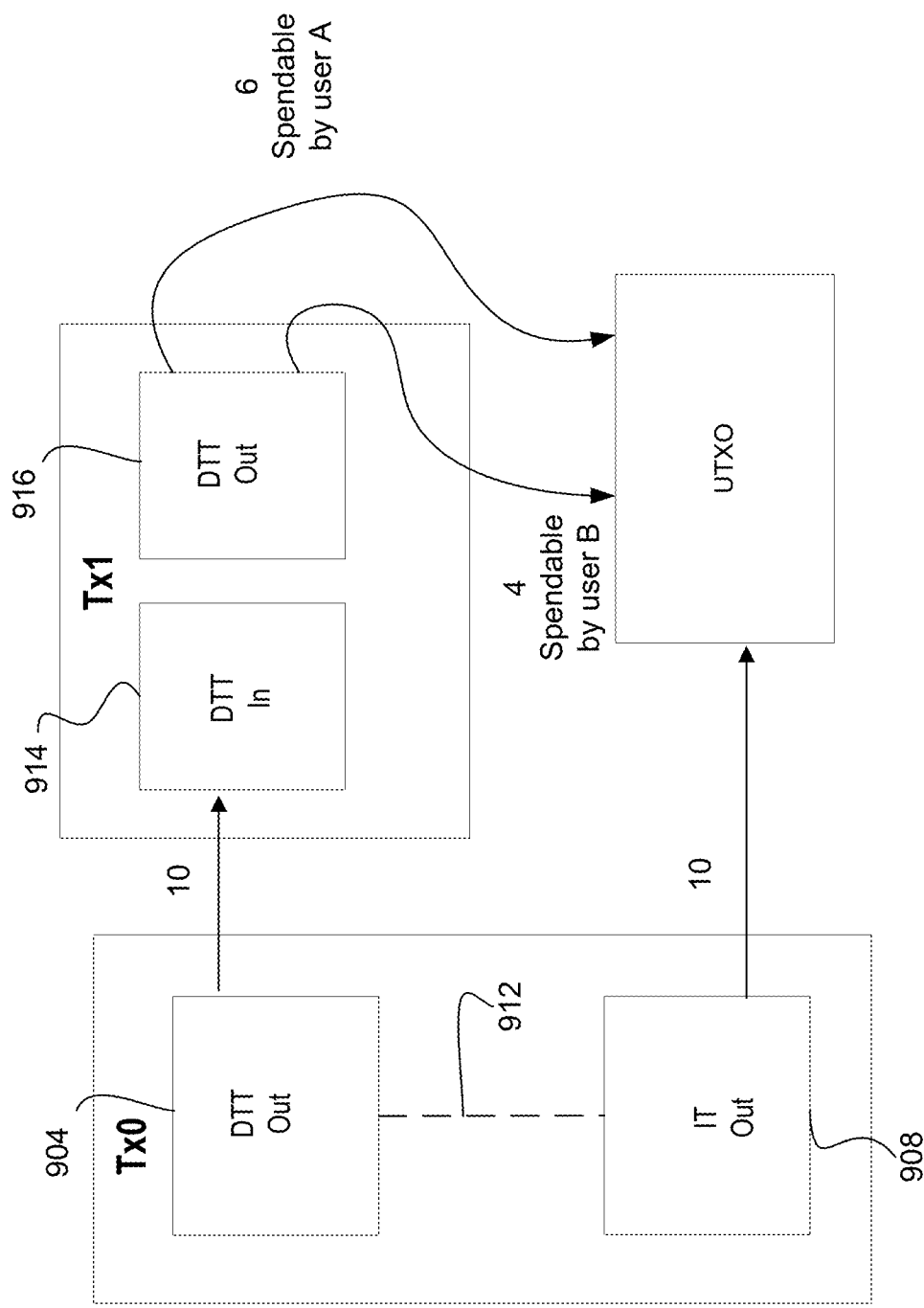
FIG. 9B depicts another example transaction, according to some embodiments.

For example, FIG. 9B illustrates example transaction Tx1, following Tx0, which transfers 4 digital tradeable tokens (DTT) from one user A to another user B. Tx1 does not include any inventory tokens because the message/transaction type is a digital tradeable token spend/transfer message. Tx1 has two outputs: one output of 4 tokens, spendable by user B, and another output of 6 tokens, which may be retained by, or are spendable by, user A. In one embodiment, the 6 tokens constitute the "change" of Tx1 and are spendable by a "change address" controlled by the party spending the tokens (e.g., user A) in Tx1. In one embodiment, Tx1 is only validated by the blockchain module validation processor 314 if the DTT In quantity equals to is less than or equal to the DTT Out quantity, i.e., a transaction can only spend a digital tradeable token quantity equal to or less than the digital tradeable token quantity input into the transaction. After Tx1, the UTXO includes all of the spendable digital tradeable tokens and the spendable inventory tokens.

The message may be a digital tradeable token destroy message. It should be appreciated that it may be necessary to remove digital tradeable tokens from the blockchain, e.g., it may be desirable to remove digital tradeable tokens when an amount of physical assets are removed from the vault, so that the blockchain continues to accurately reflect the total amount of digital tradeable tokens that are actually backed by physical assets, e.g., stored in a secure vault. A digital tradeable token destroy message may include all of the same data fields and information as the digital tradeable token create message. For example, the issuer may wish to sell a physical gold bar that is being used to back digital tradeable tokens on the blockchain. When a gold bar is sold by the issuer, the corresponding amount of digital tradeable tokens on the blockchain should be destroyed. Or, a holder of digital tradeable tokens may wish to redeem the digital tradeable tokens in exchange for physical gold. Again, the corresponding amount of digital tradeable tokens on the blockchain should be destroyed. Digital tradeable token owners could verify on the blockchain that a gold bar was removed, along with the correct amount of digital tradeable token destroyed, and would then conclude that the digital tradeable tokens still on the blockchain are still 100% gold backed, as well as consider it legitimate for parties other than the issuer to possess that gold bar.

For example, FIG. 9C illustrates example transaction Tx2, following Tx1, which destroys (e.g., marks as inactivated) 3 digital tradeable tokens. Tx2 specifies one input of 6 digital tradeable tokens, 6 DTT In, which may be the 6 digital tradeable tokens spendable by user A. Thus, user A may be an issuer who is authorized to mark tokens as inactive. Tx2 also specifies two outputs: one output of 3 digital tradeable tokens (spendable by User A) to the UTXO, and another output of 3 digital tradeable tokens to an OP_RETURN script opcode (operation code), which is used to mark transaction outputs as invalid and unspendable. Tx2 also specifies one input of 10 inventory tokens, and two outputs: one output of 7 inventory tokens to the UTXO, and another output of 3 inventory tokens to an OP_RETURN script opcode (operation code).

In one embodiment, the blockchain module validation processor 314 validates Tx2 only if:
 the sum of DTT In quantities is greater than or equal to the sum of DTT Out quantities;
 the sum of IT In quantities is equal to the sum of IT Out quantities; and
 the sum of DTT Out quantities marked inactive by OP_RETURN is greater than or equal to the sum of IT Out quantities marked inactive by OP_RETURN, i.e. that for a given amount of inventory tokens destroyed/marked inactive, at least that amount of digital tradeable tokens are destroyed/marked inactive, assuring digital tradeable token owners that the digital tradeable tokens still spendable on the blockchain are still 100% gold backed.

It can be appreciated that blockchain module validation processor 314 may instead apply more or fewer validation rules, and may instead apply modifications of these rules, such as replacing "greater than or equal to" with "equal to".

Moreover, any combination of the transactions illustrated in and described in connection with FIGS. 7, 9A, 9B and 9C may be included in the transaction array 518, e.g., as described in connection with FIG. 5.

The disclosed embodiments may also allow for a correction message to correct typographical errors. If the identification information listed in an inventory token is changed, such as serial number, weight, or fineness of a physical asset, the digital tradeable token that corresponds to the old (incorrect) inventory token should be modified by spending the incorrect inventory token in a transaction in an IT In and making available a new inventory token carrying the corrected information using an IT Out as discussed herein. If the change increases the weight, the same transaction may also contain one or more digital tradable token outputs, where the sum of the quantity of the DTT Out equals the increase in weight of the inventory token. If the change decreases the weight, the same transaction may destroy a quantity of digital tradable tokens, as discussed herein, corresponding to the decrease in weight of the inventory token. These corrections can be audited, and large numbers of unreasonable changes without substantive documentation would alert both auditors and the general public about potentially inappropriate activity.

The disclosed embodiments may allow the issuer to exchange some gold bars for others, carrying the information for each bar removed and each bar added, which would create or destroy digital tradeable tokens corresponding to the net weight difference in bars added versus removed.

In one embodiment, gold bars that previously backed digital tradeable tokens but were removed could be added again at a later point in time to back new/different digital tradeable tokens. This would be represented as the creation of a new inventory token that happens to have the same refiner, year, and serial number as the previously deleted inventory token, as well as a corresponding creation of digital tokens. This would be allowable because at no time would two active inventory tokens carry the same refiner, year, and serial number. This uniqueness could be enforced via blockchain consensus rules. Or, the public could observe the blockchain and almost immediately flag any discrepancies.

Example transaction array 518 may include several entries that correspond either to digital tradable tokens or inventory tokens. Each input may have the same form. An input may specify a previous transaction, e.g. it contains a hash of the previous transaction that acts as a hash pointer to the previous transaction. Each input may also contain the index of the previous transaction's outputs that is being claimed. For transactions creating new digital tradable tokens or new inventory tokens, the input may not specify a prior transaction hash and index. The inputs may include a signature script that verifies the transaction. Each transaction input may be signed to show that the owner has the ability to claim the previous transaction outputs. For the Bitcoin protocol, each input may include a script that generally includes a cryptographic digital signature that unlocks the funds from the prior transaction. Only the entity possessing the appropriate private key is able to create a satisfactory signature. The digital signature provides authorization that the funds may be spent. In one implementation, multiple signatures may be required (e.g. two of two signatures required, two of three signatures, three of five signatures, etc.). One or more of the parties of the multiple signatures may require alternative conditions in order to provide an authorization. In an example, a transaction may require that two of three parties provide authorization to spend digital tradeable tokens. A first party directs the transfer, a second party, e.g. a wallet provider, may provide authorization if the transaction meets certain conditions (e.g. size, authorized payees, etc.), and a third party, e.g. a recovery service, may only provide authorization when the first or second party has been compromised, e.g., has lost a key. In this way, the first party may direct the transaction, but cannot complete the transaction without authorization provided from either the second or third party. In an alternate example, a court or government authority wishing to seize digital assets for a lawful reason may compel both a wallet service provider and a recovery service to authorize one or more transactions to implement the seizure.

Each output in the example transaction array 518 may have two or more fields. The fields each have a value, and the sum of all the output values should be less than or equal to the sum of all the input values. If the sum of the output values is less than the sum of the input values, the difference is a transaction fee to a miner that solves the proof of work equation (if proof of work is required by the blockchain implementation) and publishes the transaction to a node. The transaction output further includes a script containing conditions for claiming the output (e.g. identifying an address(es), or wallet(s) for the output).

Additional fields or information may be included in the transaction message. For example, each transaction may include a description field that allows for the transaction message generator to describe the transaction. Other fields that allow for identification of the transaction type may be included. Additionally, fields or data may be included in the transaction message to indicate a rule change, as discussed in the '389 Application.

A transaction that creates a digital tradeable token may be authorized by a responsible party or parties, e.g., a party that adds physical assets, e.g., gold bars, to a vault, where the physical assets correspond to the newly created digital tradeable token. A signature shows that the party has the permissions to create digital tradeable tokens, e.g., is an issuer, e.g., of both digital tradeable tokens and their corresponding physical assets. The issuer signing should be allowed to create both tokens. This is checked via a rule list identifying the public keys of valid issuers. This rule list may also indicate parameters pertaining to multiple signatures, e.g. that transactions creating digital tradeable tokens should be signed by two different valid issuer keys. The rule list may exist off the blockchain, e.g. it may be coded into the blockchain software or exist in a configuration file, or it may exist as part of the chain, and be updated as described in the '389 Application.

In one embodiment, for transaction that do not create digital tradeable tokens, inventory token fields may be left empty. In the event that a transaction message does include an inventory token, a flag may be set in the block to indicate that the block includes an inventory token. By flagging the blocks that include inventory tokens, miners may quickly parse the blockchain to identifying digital tradeable token creating transactions. Alternatively, the miner or node may parse or search the blockchain for transactions performed by a specific party (e.g., issuer) that has authority to create digital tradeable tokens.

Digital tradeable token creation messages may be similar to digital tradeable token transaction messages i.e. the digital tradeable token creation messages may be transmitted to one or more blockchain clients, validated by the blockchain clients, and once validated would allow for the spending/transacting of the digital tradeable tokens.

The blockchain may store validation rules, which are used to determine whether transactions and/or blocks are valid, in memory 320. The disclosed embodiments may apply different validation rules for different message types. In one embodiment, the validation rules for digital tradeable token creation or destruction messages may be different than validation rules for digital tradeable token spending messages. In one embodiment, the validation rules for digital tradeable token creation or destruction messages may include an equation defining a relationship between fields in the digital tradeable token and inventory token. For instance, in one embodiment, the validation rules may require that the quantity associated with a new digital tradeable token is the same as the quantity associated with the inventory token corresponding to the digital tradeable token.

Referring back to FIG. 8, at act 804, the blockchain client identifies in data stored in a plurality of blocks of the blockchain, one more rules for validation of the transaction. Validation rules may be stored in the blockchain software or the blockchain data. The one or more rules may be identified from previous blocks and stored in the blockchain software.

In one embodiment, if the digital tradeable tokens being added to the blockchain and the corresponding inventory tokens are not equal in value, the method may include generating an alert. The alert may be transmitted to a computing device that submitted the data message including the digital tradeable token and the inventory token.

At act 806, the blockchain client determines if the transaction is valid according to the one or more determined validation rules. In one embodiment, the validation rule that is applied is based on the data message type. For example, if the data message is a create or destroy digital tradeable token message, the validation rule may require that the data message include both a digital tradeable token and an inventory token. Additionally, in one embodiment, the validation rule may require that the quantity associated with the digital tradeable token and the inventory token satisfy a predetermined relationship. Alternatively, the validation rule may require that the quantity associated with the digital tradeable token and the inventory token are equal.

If the data message is determined to be valid, at act 808, the blockchain client generates a new block including the transaction. The new block is generated comprising at least the data indicative of the change to the blockchain.

At act 810, the generated new block is communicated to other blockchain clients in the blockchain system e.g., to the network of entities implementing the blockchain. In one embodiment, the other blockchain clients also validate all transactions within the block and, if valid, add the block, including all of its transactions, to their copy of the blockchain.

As described above in FIG. 1, blockchain technology is based on a ledger that uses a series of blocks to build a chain of transactions. The new block generated with data from the transaction message may become part of the chain of blocks if validated by other blockchain clients.

When a block is added to the blockchain and validated by the blockchain clients in the network, the block becomes a permanent part of the blockchain. The next block will contain a hash of the added block's header that links the two blocks together and makes up the chain. However, for the first block in the chain, there is no previous block. A genesis block or block 0 may be used to start or seed a blockchain.

As discussed herein, an issuer may implement the disclosed embodiments to provide a digital tradeable token system where the physical assets backing the digital tradeable tokens can be conveniently audited. Each time the issuer wishes to add digital tradeable tokens to the blockchain, the issuer should also add correspond inventory tokens to the blockchain that specify information about the physical assets that are backing the digital tradeable token. It should be appreciated that only the inventory token is tied to the physical asset. Once a digital tradeable token is added to the blockchain, the digital tradeable token can be freely transferred and/or spent without referencing the physical asset that is listed as backing up the digital tradeable token. Thus, the disclosed embodiments allow a high level of flexibility as to how the digital tradeable tokens are spent, while still ensuring that all of the digital tradeable tokens on the blockchain are backed by physical asset.

For example, if the physical asset is gold, or some other precious metal, users of the digital tradeable token system are not typically concerned that the very same gold bar that backed up a digital tradeable token when the digital tradeable token was created continues to back the same digital tradeable token throughout the life of the digital tradeable token, or for as long as the digital tradeable token is active in the system. Users typically are only concerned that an amount of weight of the precious metal, e.g., gold, in a secure vault is available at all times to back a digital tradeable token. Thus, users are only concerned that a digital tradeable token representing 100 troy ounces of gold is always backed by, or is exclusively associated with, 100 troy ounces of gold in a secure vault. The disclosed embodiments enable this by essentially decoupling a digital tradeable token from an inventory token once the digital tradeable token creation message has been validated.

In one embodiment, the blockchain consensus and validation rules may not allow creation of a block if the block does not result in the total sum of the weight/quantity associated with the digital tradeable tokens on the blockchain to be equal to the total sum of the weight/quantity associated with the inventory tokens on the blockchain.

In one embodiment, the disclosed embodiments may implement a blockchain that stores information about different tokens, such as digital tradeable tokens that may be freely exchanged and, for example, can be used as currency, and inventory tokens token that include information about physical assets used to back the digital tradeable tokens.

In one embodiment, the blockchain may be available for inspection by the public, or to interested parties, such as users who are owners of digital tradeable token, auditors, gold refiners, etc. Auditors can query the blockchain to ensure that the total quantity (or weight) associated with the digital tradeable tokens is equal to the total quantity (or weight) associated with the inventory tokens.

The disclosed embodiments may also allow for conveniently querying the blockchain to ensure that the tokens contained therein satisfy predetermined relationships. A user can query the blockchain at any time to determine the total sum of digital tradeable tokens and inventory tokens.

As discussed herein, a blockchain includes multiple blocks chained together. A blockchain parser may query the blockchain for information stored in the distributed ledger. When a blockchain client is setup or installed, the blockchain software may parse the blockchain to identify the total quantity represented by the digital tradeable tokens, as well as the total quantity represented by the inventory tokens, and verify that they both total quantities that are equivalent in value.

Figure 10:
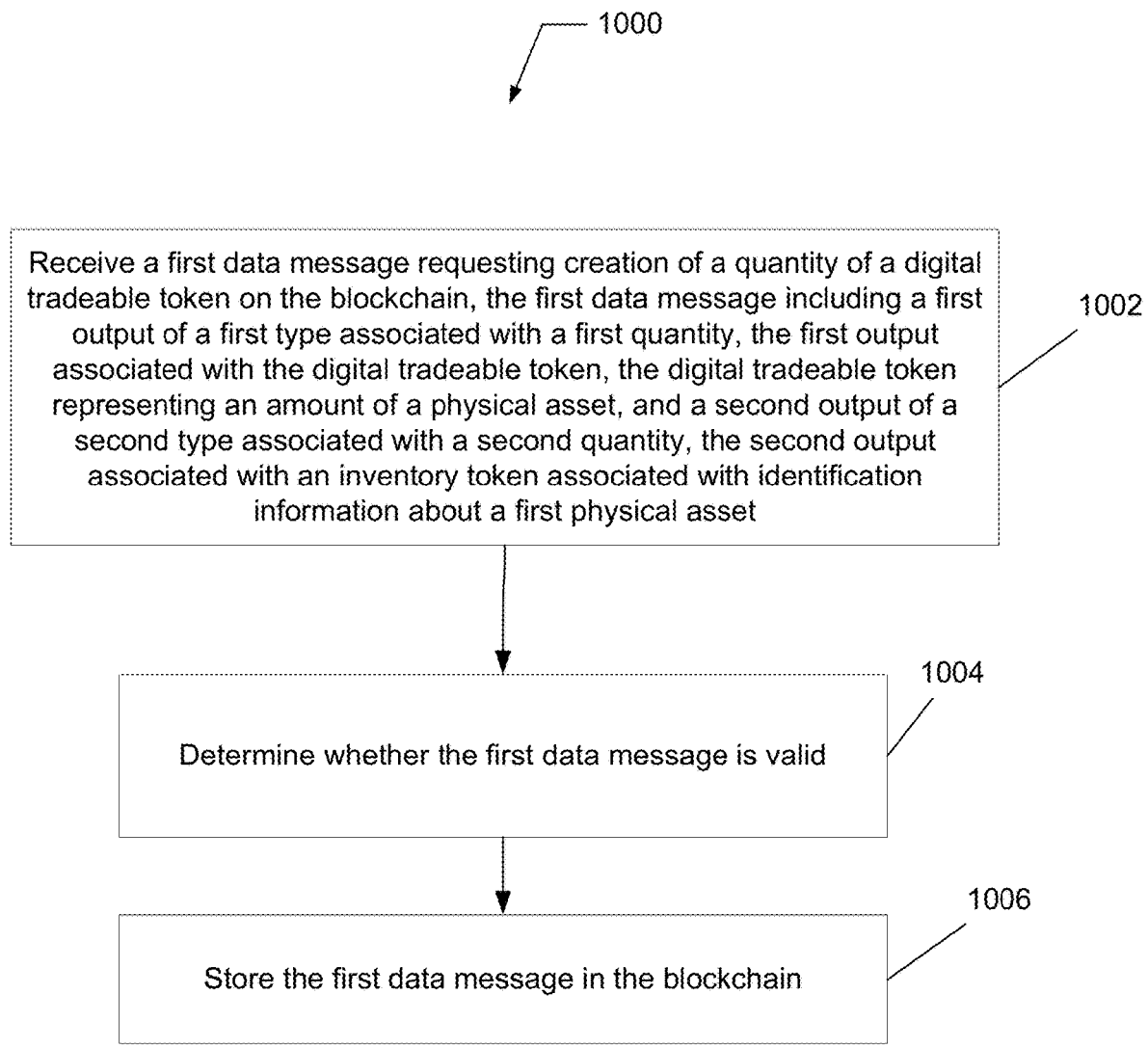
FIG. 10 depicts a high-level flowchart illustrating a method for implementing a blockchain including a plurality of linked digital assets including digital tradeable tokens and inventory tokens, according to some embodiments.

FIG. 10 illustrates an example computer implemented method 1000 which may be implemented in an exchange computing system that includes a blockchain module described herein. Embodiments may involve all, more or fewer actions indicated by the actions of FIG. 10. The actions may be performed in the order or sequence shown or in a different sequence.

Method 100 includes, receiving, by a processor, a first data message requesting creation of a quantity of a digital tradeable token on the blockchain, the first data message including a first output of a first type associated with a first quantity, the first output associated with the digital tradeable token, the digital tradeable token representing an amount of a physical asset, and a second output of a second type associated with a second quantity, the second output associated with an inventory token associated with identification information about a first physical asset, as shown in step 1002.

Method 100 also includes determining, by the processor, whether the first data message is valid, as shown in step 1004.

Method 100 also includes, upon determining, by the processor, that the first data message is valid, storing the first data message in the blockchain, as shown in step 1006.

In an embodiment, the method may also include, wherein determining whether the first data message is valid includes determining whether the first quantity and the second quantity satisfy a predetermined equation.

In an embodiment, the method may also include, wherein determining whether the first data message is valid includes determining whether the first quantity equals the second quantity.

In an embodiment, the method may also include, wherein the first physical asset associated with the inventory token has been placed in a secure physical vault containing a plurality of physical assets.

In an embodiment, the method may also include, wherein the first physical asset is a metal, and wherein the identification information about the first physical asset includes at least one of: the metal refiner; year of manufacture; a serial number; an assayed fineness of a unit of the metal; or a weight of the first physical asset.

In an embodiment, the method may also include, wherein the first quantity is based on the weight of the first physical asset.

In an embodiment, the method may also include, wherein outputs of different types received by the processor in a same data message are stored in a same block of the blockchain. In one embodiment, the outputs of different types received by the processor in a same data message are stored in a same transaction in a block of the blockchain.

In an embodiment, the method may also include, wherein information about a digital tradeable token that represents an amount of an unspecified physical asset and its corresponding inventory token that is associated with a specified physical asset are stored in a same block of the blockchain.

In an embodiment, the method may also include, further comprising associating the first output with a first owner.

In an embodiment, the method may also include, wherein the first and second outputs are marked active, the method further comprising: receiving, by the processor, a second data message requesting transfer of a quantity of the digital tradeable token from the first owner to a second owner, the second data message including a first input of the first type associated with a third quantity and based on the first output, and a third output of the first type associated with a fourth quantity; determining, by the processor, whether the second data message is valid; and upon determining, by the processor, that the second data message is valid, storing the second data message in the blockchain.

In an embodiment, the method may also include, wherein determining whether the second data message is valid includes determining whether the second data message has been cryptographically signed with a private key associated with the first owner.

In an embodiment, the method may also include, wherein determining whether the second data message is valid includes determining that the fourth quantity is less than or equal to the third quantity.

In an embodiment, the method may also include, wherein the third output is associated with the second owner.

In an embodiment, the method may also include, further comprising: receiving, by the processor, a third data message requesting inactivation of a quantity of the digital tradeable token on the blockchain, the third data message including: a second input of the first type associated with a fifth quantity and based on the third output, a third input of the second type associated with a sixth quantity and based on the second output, a fourth output of the first type associated with a seventh quantity, and a fifth output of the second type associated with an eighth quantity; determining, by the processor, whether the third data message is valid; and upon determining, by the processor, that the third data message is valid, storing the third data message in the blockchain.

In an embodiment, the method may also include, wherein storing the third data message in the blockchain includes marking the fourth and fifth outputs inactive.

In an embodiment, the method may also include, wherein determining whether the third data message is valid includes determining that the third data message has been cryptographically signed with a private key associated with an owner authorized to deactivate digital tradeable tokens.

In an embodiment, the method may also include, wherein determining whether the third data message is valid includes determining whether the seventh quantity and the eighth quantity satisfy a predetermined equation.

In an embodiment, the method may also include, wherein determining whether the third data message is valid includes determining whether the seventh quantity equals the eighth quantity.

In an embodiment, the method may also include, wherein each input of a type is based on an output of the same type from a previous data message.

In an embodiment, the method may also include, wherein the fifth output is associated with an inventory token associated with identification information about a second physical asset, wherein the second physical asset has been removed from a secure physical vault containing a plurality of physical assets. In one embodiment, the fifth output is associated with an inventory token associated with identification information about a second physical asset, wherein the identification information includes at least one of: the metal refiner; year of manufacture; a serial number; an assayed fineness of a unit of the metal; or a weight of the second physical asset, and wherein an amount of the metal based on the weight of the second physical asset is no longer associated with the first owner.

In an embodiment, the method may also include, wherein the second physical asset is a metal, and wherein the identification information includes at least one of: the metal refiner; year of manufacture; a serial number; an assayed fineness of a unit of the metal; or a weight of the second physical asset.

In an embodiment, the method may also include, wherein the weight of the second physical asset is based on the seventh quantity.

In an embodiment, the method may also include, wherein the first physical asset is not the same as the second physical asset. In one embodiment, the method contemplates, or may include, additional transactions not discussed or shown herein (e.g., intervening transactions) that create/issue additional digital tradable tokens representing an amount of a physical asset and its corresponding inventory tokens associated with a specific physical asset, so that the first physical asset need not be the same as the second physical asset.

In an embodiment, the method may also include, further comprising, upon determining that the first data message is not valid, generating, by the processor, an alert.

Figure 11:
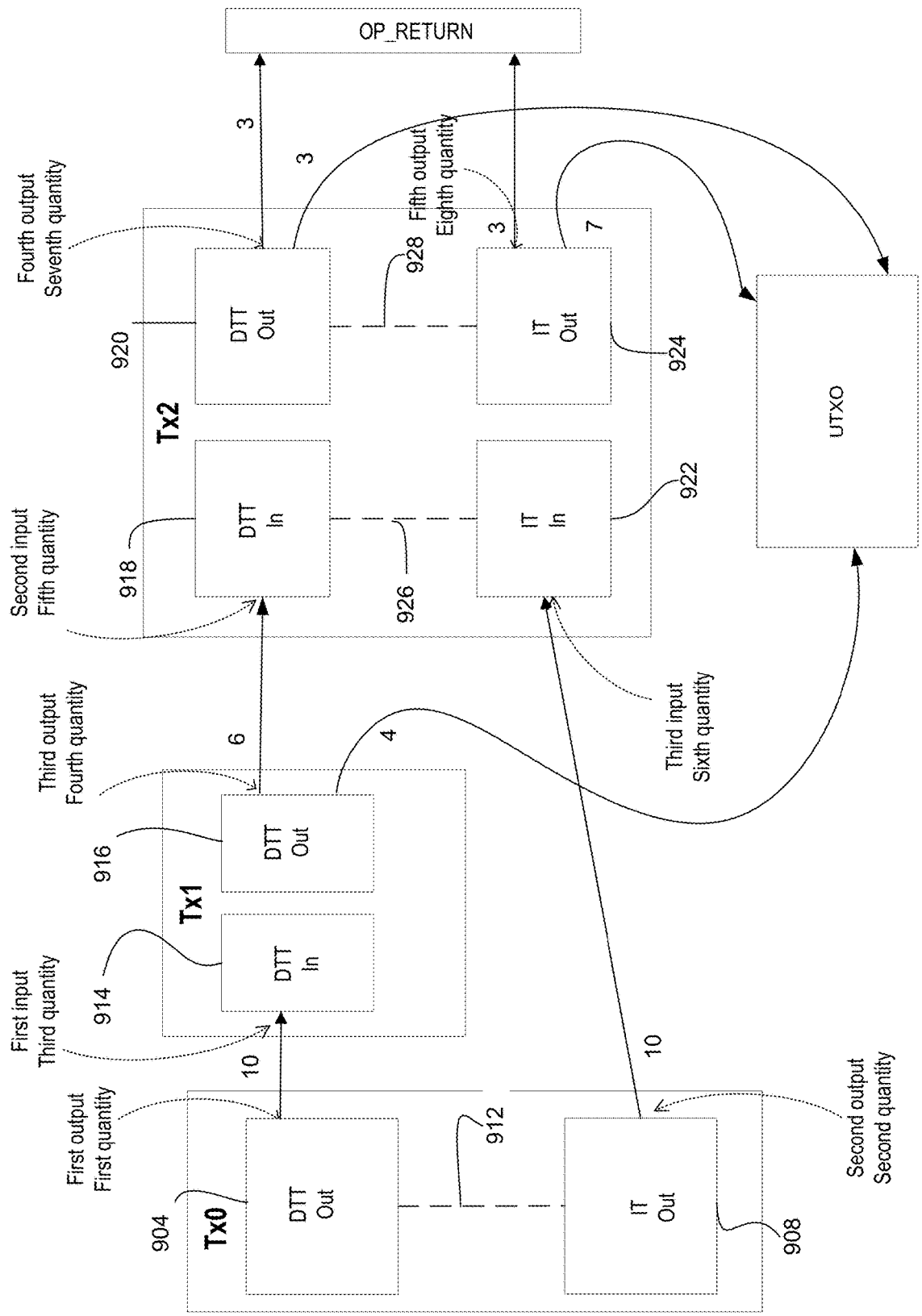
FIG. 11 depicts another example transaction, according to some embodiments.

In an embodiment, the method may also include, further comprising: marking outputs as active or inactive; storing outputs marked active in an Unspent Transaction Output ("UTXO") database; and transmitting outputs marked inactive to an OP_RETURN script operation code For example, FIG. 11 illustrates example transactions similar to the transactions illustrated in FIG. 9C. The transactions may be received by a processor as data messages. The first data message may include a first output and a second output, as shown in FIG. 11. The second data message may include a first input and a third output, as shown in FIG. 11. The third data message may include a second input and a third input, and a fourth output and a fifth output, as shown in FIG. 11.

It should be appreciated that the validation rules described herein are exemplary and the rules implemented by the blockchain software and/or otherwise allowed to be added, removed or modified as described herein, are implementation dependent and other rules may be developed, now or at later time, in addition to and/or in lieu of the above described rules, to which the disclosed embodiments would be applicable.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for digitally representing at least a non-fungible portion of an asset of an asset type, characterized by a fixed number of fungible portions thereof, to enable digital transactions in one or more of the fungible portions without exceeding the fixed number thereof, the method comprising:

receiving, by a processor, a first data message requesting to store data indicative of a first quantity of digital tradeable assets, each representative of one fungible portion of the asset type, in a data structure stored in a memory coupled with the processor;

generating, by the processor based on the request, data indicative of a corresponding digital inventory asset different from the digital tradeable assets, wherein the digital inventory asset is separate from and corresponds to the at least non-fungible portion of the asset, wherein the digital inventory asset comprises identification information which uniquely identifies the corresponding non-fungible portion of the asset among all other non-fungible portions of all other assets and data indicating the fixed number of fungible portions thereof, wherein each of the digital tradeable assets is independently transferrable there among as well as independent of the corresponding digital inventory asset via modification of the data structure; and determining, by the processor, that the first data message is valid by at least (i) determining that the collective fungible portions of the asset type represented by each digital tradeable asset of the first quantity equals the fixed number of portions of the non-fungible portion of the asset to which the digital inventory asset corresponds, and (ii) determining that the identification information is not duplicative of identification information of another valid digital inventory asset stored in the data structure; and upon determining, by the processor, that the first data message is valid, storing, in a same transaction, the data indicative of each of the first quantity of digital tradeable assets and the data indicative of the corresponding digital inventory asset together in a same sub-structure of the data structure created as a function of the transaction.

2. The computer implemented method of claim 1, wherein the data structure comprises a blockchain.

3. The computer implemented method of claim 1, wherein the asset type comprises one of a precious metal, real property, a security instrument, or other type of uniquely identifiable asset.

4. The computer implemented method of claim 1, wherein the asset corresponding to the digital inventory asset is a physical asset which has been placed in a secure physical vault containing a plurality of physical assets.

5. The computer implemented method of claim 1, wherein the corresponding asset is a metal, and wherein the identification information of the corresponding asset includes at least one of: the metal refiner; year of manufacture; a serial number; an assayed fineness of a unit of the metal; or a weight of the corresponding asset.

6. The computer implemented method of claim 5, wherein the first quantity is based on a total weight of the corresponding asset.

7. The computer implemented method of claim 1, wherein information about a digital tradeable asset that represents an amount of the asset type and its corresponding digital inventory asset that is associated with a specified asset are stored together in the data structure.

8. The computer implemented method of claim 1, further comprising associating the first quantity of digital tradeable assets with a first owner in the data structure.

9. The computer implemented method of claim 8, further comprising:
receiving, by the processor, a second data message requesting transfer of a second quantity of the stored digital tradeable assets from the first owner to a second owner;
determining, by the processor, whether the second data message is valid; and
upon determining, by the processor, that the second data message is valid, modifying the data structure to reflect a change in ownership a second quantity of the stored digital tradeable assets.

10. The computer implemented method of claim 9, wherein determining whether the second data message is valid includes determining whether the second data message has been cryptographically signed with a private key associated with the first owner.

11. The computer implemented method of claim 9, wherein determining whether the second data message is valid includes determining that the second quantity is less than or equal to the first quantity.

12. The computer implemented method of claim 1, further comprising, upon determining that the first data message is not valid, generating, by the processor, an alert.

13. The computer implemented method of claim 1, further comprising:
marking each of the quantity of digital tradeable assets and the digital inventory asset as active or inactive;
storing those of the quantity of digital tradeable assets and the digital inventory asset marked active in an Unspent Transaction Output ("UTXO") database; and
transmitting those of the quantity of digital tradeable assets and the digital inventory asset marked inactive to an OP_RETURN script operation code.

14. A non-transitory computer-readable medium storing instructions for digitally representing at least a non-fungible portion of an asset of an asset type, characterized by a fixed number of fungible portions thereof, to enable digital transactions in one or more of the fungible portions without exceeding the fixed number thereof, that, when executed by a processor, cause the processor to:
receive a first data message requesting to store data indicative of a first quantity of digital tradeable assets, each representative of one fungible portion of the asset type, in a data structure stored in a memory coupled with the processor;
generate, based on the request, data indicative of a corresponding digital inventory asset different from the digital tradeable assets, wherein the digital inventory asset is separate from and corresponds to the at least non-fungible portion of the asset, wherein the digital inventory asset comprises identification information which uniquely identifies the corresponding non-fungible portion of the asset among all other non-fungible portions of all other assets and data indicating the fixed number of fungible portions thereof, wherein each of the digital tradeable assets is independently transferrable there among as well as independent of the digital inventory asset via modification of the data structure; and
determine that the first data message is valid by at least (i) determining that the collective fungible portions of the asset type represented by each digital tradeable asset of the first quantity equals the fixed number of portions of the non-fungible portion of the asset to which the digital inventory asset corresponds, and (ii) determining that the identification information is not duplicative of identification information of another valid digital inventory asset stored in the data structure; and
upon the determination that the first data message is valid, store, in a same transaction, the data indicative of each of the first quantity of digital tradeable assets and the data indicative of the corresponding digital inventory asset together in a same sub-structure of the data structure created as a function of the transaction.

15. The non-transitory computer-readable medium of claim 14, wherein the data structure comprises a blockchain.

16. The non-transitory computer-readable medium of claim 15, wherein the asset type comprises one of a precious metal, real property, a security instrument, or other type of uniquely identifiable asset.

17. The non-transitory computer-readable medium of claim 14, wherein the corresponding asset associated with the digital inventory asset is a physical asset which has been placed in a secure physical vault containing a plurality of physical assets.

18. The non-transitory computer-readable medium of claim 14, wherein the corresponding asset is a metal, and wherein the identification information of the corresponding asset includes at least one of: the metal refiner; year of manufacture; a serial number; an assayed fineness of a unit of the metal; or a weight of the corresponding asset.

19. The non-transitory computer-readable medium of claim 18, wherein the first quantity is based on a total weight of the corresponding asset.

20. The non-transitory computer-readable medium of claim 14, wherein information about a digital tradeable asset that represents an amount of the asset type and its corresponding digital inventory asset that is associated with a specified asset are stored together in the data structure.

21. The non-transitory computer-readable medium of claim 14, further comprising associating the first quantity of digital tradeable assets with a first owner in the data structure.

22. The non-transitory computer-readable medium of claim 21, wherein the instructions are further executable by the processor to cause the processor to:
receive a second data message requesting transfer of a second quantity of the stored digital tradeable assets from the first owner to a second owner;
determine whether the second data message is valid; and
upon the determination that the second data message is valid, modify the data structure to reflect a change in ownership a second quantity of the stored digital tradeable assets.

23. The non-transitory computer-readable medium of claim 22, wherein the determination as to whether the second data message is valid includes a determination as to whether the second data message has been cryptographically signed with a private key associated with the first owner.

24. The non-transitory computer-readable medium of claim 22, wherein the determination as to whether the second data message is valid includes a determination that the second quantity is less than or equal to the first quantity.

25. The non-transitory computer-readable medium of claim 14, wherein the instructions are further executable by the processor to cause the processor to, upon the determination that the first data message is not valid, generate an alert.

\* \* \* \* \*